(12) United States Patent
Kim

(10) Patent No.: US 11,579,966 B1
(45) Date of Patent: Feb. 14, 2023

(54) SEMICONDUCTOR SYSTEM RELATED TO PERFORMING A TRAINING OPERATION

(71) Applicant: SK hynix Inc., Icheon-si (KR)

(72) Inventor: Du Hyun Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/523,644

(22) Filed: Nov. 10, 2021

(30) Foreign Application Priority Data

Aug. 5, 2021 (KR) .......................... 10-2021-0103247

(51) Int. Cl.
*G06F 11/00* (2006.01)
*G06F 11/10* (2006.01)

(52) U.S. Cl.
CPC ...... *G06F 11/1004* (2013.01); *G06F 11/1068* (2013.01)

(58) Field of Classification Search
None
See application file for complete search history.

(56) References Cited

U.S. PATENT DOCUMENTS

| | | | |
|---|---|---|---|
| 8,745,464 B2 | 6/2014 | Subashchandrabose et al. | |
| 10,872,645 B1* | 12/2020 | Choi | G11C 29/023 |
| 11,487,615 B2* | 11/2022 | Kim | G06F 11/106 |
| 2002/0097623 A1* | 7/2002 | Suzuki | G11C 7/227 |
| | | | 365/210.1 |
| 2017/0371745 A1* | 12/2017 | Lee | G11C 7/04 |
| 2019/0371391 A1* | 12/2019 | Cha | G06F 11/106 |
| 2021/0208965 A1* | 7/2021 | Cha | G11C 11/406 |

FOREIGN PATENT DOCUMENTS

| | | |
|---|---|---|
| KR | 1020180083975 A | 7/2018 |
| KR | 102045712 B1 | 11/2019 |

OTHER PUBLICATIONS

L. T. Clark, D. W. Patterson, C. Ramamurthy and K. E. Holbert, "An Embedded Microprocessor Radiation Hardened by Microarchitecture and Circuits," in IEEE Transactions on Computers, vol. 65, No. 2, pp. 382-395, Feb. 1, 2016, doi: 10.1109/TC.2015.2419661. (Year: 2016).*

* cited by examiner

*Primary Examiner* — Daniel F. McMahon
(74) *Attorney, Agent, or Firm* — William Park & Associates Ltd.

(57) ABSTRACT

A semiconductor system includes a process control circuit configured to determine whether to perform a patrol training operation, generate a voltage code signal for adjusting a level of a reference voltage which determines a logic level of data in a target memory circuit, and adjust the voltage code signal on the basis of a fail information signal corresponding to the target memory circuit, an operation control circuit configured to receive a command and an address from a host, generate, from the command, a write signal and a read signal for performing a normal operation, and generate, from the address, an internal address for performing the normal operation and an error detection circuit configured to detect an error in the data by receiving the data from the target memory circuit, and generate the fail information signal depending on whether the error has occurred in the data.

26 Claims, 17 Drawing Sheets

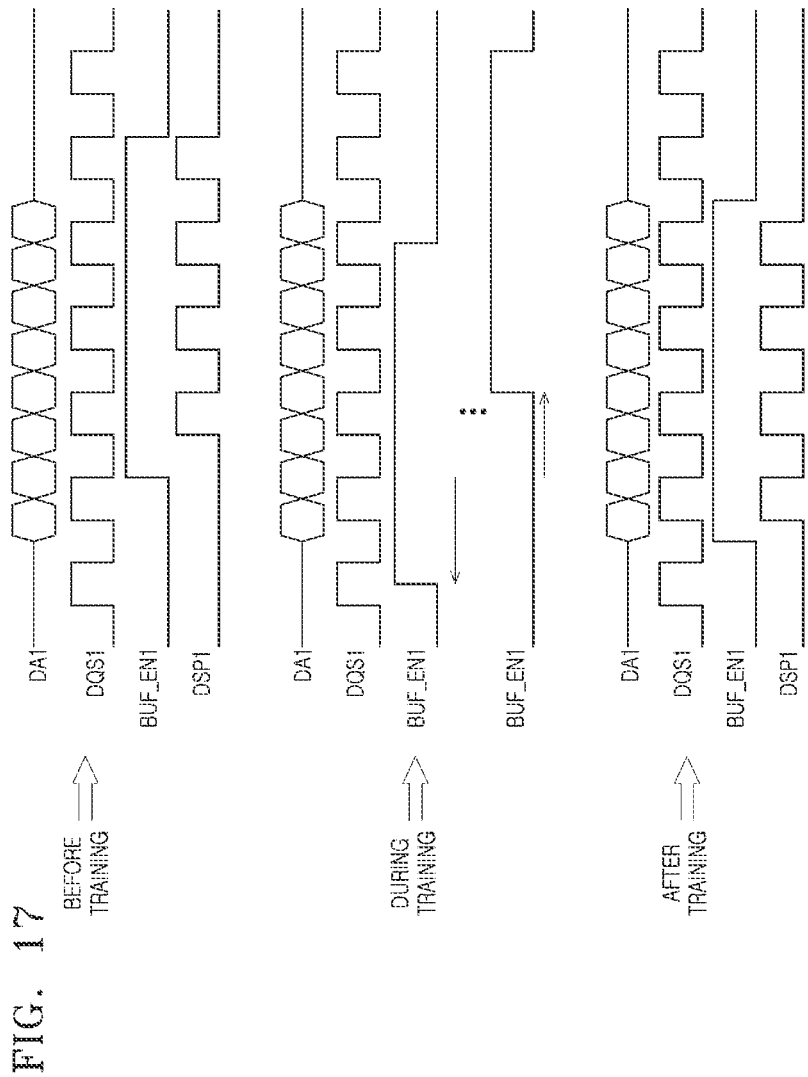

SEMICONDUCTOR SYSTEM RELATED TO PERFORMING A TRAINING OPERATION

CROSS-REFERENCE TO RELATED APPLICATION

The present application claims priority under 35 U.S.C. § 119(a) to Korean application number 10-2021-0103247, filed in the Korean Intellectual Property Office on Aug. 5, 2021, the entire disclosure of which is incorporated herein by reference in its entirety.

BACKGROUND

1. Technical Field

Embodiments of the present disclosure may generally relate to a semiconductor system, and more particularly, to a semiconductor system related to performing a training operation of a signal transmission circuit coupling a controller and a memory circuit.

2. Related Art

Recently, in order to increase the operating speed of a semiconductor device, various schemes for inputting/outputting data including a plurality of bits per clock cycle have been used. In the case where an input/output speed of data is increased, the probability of occurrence of an error during a data transmission process also increases. Therefore, a separate device and method for ensuring the reliability of data transmission are additionally demanded.

For example, there is used a method of generating error codes capable of checking the occurrence of an error and transmitting the error codes together with data, at each time when data is transmitted, thereby ensuring the reliability of data transmission. The error codes include an error detection code (EDC) capable of detecting an occurred error and an error correction code (ECC) capable of self-correcting an error upon occurrence of the error.

As the high integration and high-speed operation of a semiconductor device progress, locations of memory circuits provided in a semiconductor system are variously set, and thus, the lengths of lines through which signals are transmitted are variously set. In order to maintain the same the delay amounts of such lines through which signals are transmitted, various training methods are needed.

SUMMARY

In an embodiment, a semiconductor system may include: a process control circuit configured to determine whether to perform a patrol training operation, and adjust a delay amount of a delay cell which is coupled to a target memory circuit, on the basis of a fail information signal corresponding to the target memory circuit; an operation control circuit configured to receive a command and an address from a host, generate and output, to a plurality of memory circuits, a write signal, a read signal and an internal address for performing a normal operation, and perform a read modify write operation by receiving a scrub control signal; a scrub control circuit configured to store a plurality of addresses, and generate the scrub control signal when the number of the stored addresses reaches a preset value; and an error detection circuit configured to, in the read modify write operation, detect an error of data by receiving the data from the target memory circuit, and generate the fail information signal depending on whether an error has occurred in the data.

In an embodiment, an electronic device may include: a process control circuit configured to determine whether to perform a patrol training operation, and adjust a delay amount of a delay cell which is coupled to a target memory circuit, on the basis of a fail information signal corresponding to the target memory circuit; an operation control circuit configured to receive a command and an address from a host, generate, from the command, a write signal and a read signal for performing a normal operation, and generate, from the address, an internal address for performing the normal operation; and an error detection circuit configured to detect an error in data by receiving the data from the target memory circuit, and generate the fail information signal depending on whether the error has occurred in the data.

In an embodiment, a semiconductor system may include: a process control circuit configured to determine whether to perform a patrol training operation, generate a voltage code signal for adjusting a level of a reference voltage which determines a logic level of data in a target memory circuit, and adjust the voltage code signal on the basis of a fail information signal corresponding to the target memory circuit; an operation control circuit configured to receive a command and an address from a host, generate, from the command, a write signal and a read signal for performing a normal operation, and generate, from the address, an internal address for performing the normal operation; and an error detection circuit configured to detect an error in the data by receiving the data from the target memory circuit, and generate the fail information signal depending on whether the error has occurred in the data.

In an embodiment, a semiconductor system may include: a process control circuit configured to determine whether to perform a patrol training operation, and adjust an enable time point of a buffer which is coupled to a target memory circuit, on the basis of a fail information signal corresponding to the target memory circuit; an operation control circuit configured to receive a command and an address from a host, generate and output, to a plurality of memory circuits, a write signal, a read signal and an internal address for performing a normal operation, and perform a read modify write operation by receiving a scrub control signal; a scrub control circuit configured to store a plurality of addresses, and generate the scrub control signal when the number of the stored addresses reaches a preset value; and an error detection circuit configured to, in the read modify write operation, detect an error of data by receiving the data from the target memory circuit, and generate the fail information signal depending on whether an error has occurred in the data.

BRIEF DESCRIPTION OF THE DRAWINGS

FIG. 17 is a timing diagram for explaining a patrol training operation in accordance with the embodiment of the present disclosure.

DETAILED DESCRIPTION

Figure 1:
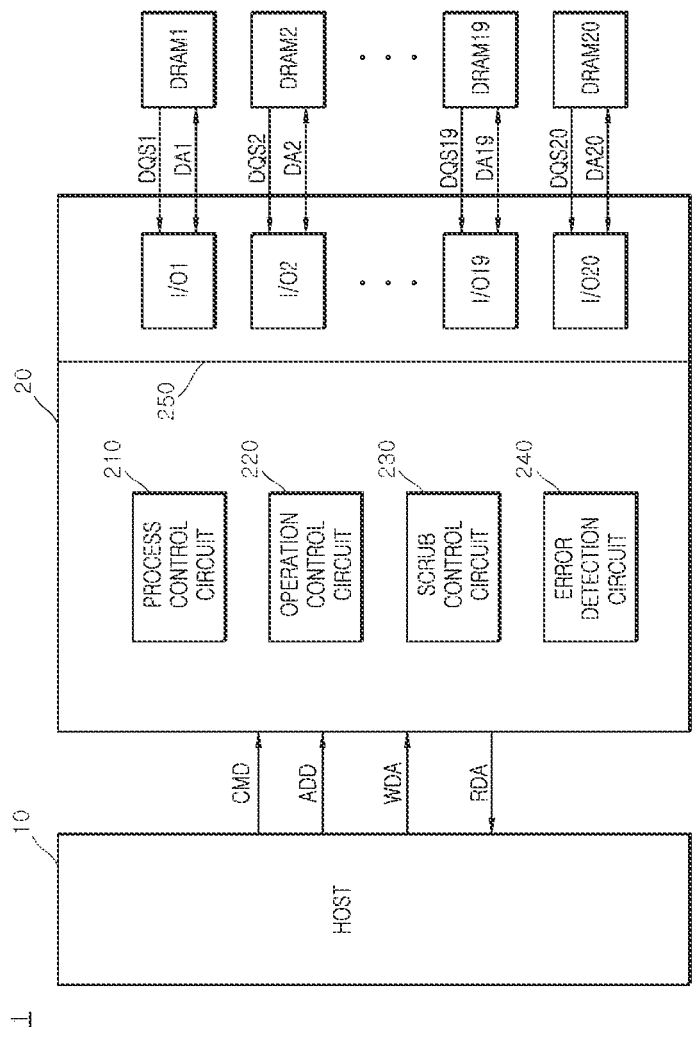
FIG. 1 is a block diagram illustrating a configuration of a semiconductor system in accordance with an embodiment of the present disclosure.

The term "preset" means that the numerical value of a parameter is predetermined when the parameter is used in a process or algorithm. According to an embodiment, the numerical value of the parameter may be set when the process or algorithm is started or while the process or algorithm is performed.

Terms such as "first" and "second," which are used to distinguish among various components, are not limited by the components. For example, a first component may be referred to as a second component, and vice versa.

When one component is referred to as being "coupled" or "connected" to another component, it should be understood that the components may be directly coupled or connected to each other or coupled or connected to each other through still another component interposed therebetween. On the other hand, when one component is referred to as being "directly coupled" or "directly connected" to another component, it should be understood that the components are directly coupled or connected to each other without still another component interposed therebetween.

"Logic high level" and "logic low level" are used to describe the logic levels of signals. A signal having "logic high level" is distinguished from a signal having "logic low level." For example, when a signal having a first voltage corresponds to a "logic high level," a signal having a second voltage may correspond to a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level according to an embodiment, and a signal having a logic low level may be set to have a logic high level according to an embodiment.

Hereafter, the teachings of the present disclosure will be described through embodiments. These embodiments are only used to exemplify the teachings of the present disclosure, and the scope of the present disclosure is not limited by the embodiments.

Various embodiments are directed to a semiconductor system which performs a patrol training operation for adjusting a delay amount of a signal transmission circuit coupling a controller and a memory circuit during a write operation and a read operation.

According to the embodiments of the present disclosure, it is possible to perform a patrol training operation of adjusting a delay amount of a signal transmission circuit coupling a controller and a memory circuit during a write operation and a read operation.

According to the embodiments of the present disclosure, by performing the patrol training operation of adjusting a delay amount of the signal transmission circuit coupling the controller and the memory circuit during a write operation and a read operation, it is possible to secure the reliability of data input and output through the signal transmission circuit.

Also, according to the embodiments of the present disclosure, it is possible to perform a patrol training operation of adjusting the level of a reference voltage for determining the logic level of data in a memory circuit during a write operation and a read operation.

According to the embodiments of the present disclosure, by performing the patrol training operation of adjusting the level of the reference voltage for determining the logic level of data in the memory circuit during a write operation and a read operation, it is possible to secure the reliability of data input and output through a signal transmission circuit.

As illustrated in FIG. 1, a semiconductor system 1 in accordance with an embodiment of the present disclosure may include a host 10, a controller 20 and first to twentieth memory circuits DRAM1 to DRAM20.

The host 10 may output, to the controller 20, a command CMD, an address ADD and write data WDA for performing a write operation. The host 10 may output, to the controller 20, a command CMD and an address ADD for performing a read operation, and may receive read data RDA from the controller 20. While each of the command CMD, the address ADD, the write data WDA and the read data RDA is illustrated as one signal, it is to be noted that, according to an embodiment, each of the command CMD, the address ADD, the write data WDA and the read data RDA may be set as a signal including a plurality of bits.

The controller 20 may control the write operation of the first to twentieth memory circuits DRAM1 to DRAM20 by receiving the command CMD and the address ADD from the host 10. The controller 20 may control the read operation of the first to twentieth memory circuits DRAM1 to DRAM20 by receiving the command CMD and the address ADD from the host 10. The controller 20 may control a patrol training operation by receiving the command CMD and the address ADD from the host 10. In the patrol training operation, the controller 20 may control a read modify write operation of the first to twentieth memory circuits DRAM1 to DRAM20. The command CMD may be set as a command for performing the write operation, the read operation and the read modify write operation of the first to twentieth memory circuits DRAM1 to DRAM20, and may be set to include a plurality of bits. The address ADD may be set as a signal for selecting the first to twentieth memory circuits DRAM1 to DRAM20 in the write operation, the read operation and the read modify write operation, and may be set to include a plurality of bits. The controller 20 is implemented as a controller for controlling the operation of the first to twentieth memory circuits DRAM1 to DRAM20. However, according to an embodiment, the controller 20 may be implemented as any one of a test device and an electronic device for controlling the operation of the first to twentieth memory circuits DRAM1 to DRAM20.

The controller 20 may include a process control circuit 210, an operation control circuit 220, a scrub control circuit 230, an error detection circuit 240 and a signal transmission circuit 250.

During the write operation and the read operation, the process control circuit 210 may determine the patrol training operation. In the patrol training operation, the process control circuit 210 may adjust the delay amounts of delay cells which are coupled to the first to twentieth memory circuits DRAM1 to DRAM20.

The operation control circuit 220 may receive the command CMD and the address ADD from the host 10. The operation control circuit 220 may control the write operation and the read operation of a normal operation on the basis of the command CMD and the address ADD. The operation control circuit 220 may control the read modify write operation on the basis of the command CMD and the address ADD. The operation control circuit 220 may generate a training address TADD (see FIG. 2) by receiving a scrub address SADD (see FIG. 2) from the scrub control circuit 230. The normal operation includes a write operation and a read operation. The read operation is an operation of outputting first to twentieth data DA1 to DA20 stored in the first to twentieth memory circuits DRAM1 to DRAM20. The write operation is an operation of storing the first to twentieth data DA1 to DA20 in the first to twentieth memory circuits DRAM1 to DRAM20. The read modify write operation is an operation of correcting errors included in the first to twentieth data DA1 to DA20 and storing the first to twentieth data DA1 to DA20 in which the error are corrected.

The scrub control circuit 230 may receive the address ADD from the host 10. The scrub control circuit 230 may generate, from the address ADD, the scrub address SADD (see FIG. 2) for performing the read modify write operation.

In the write operation of the normal operation, the error detection circuit 240 may receive the write data WDA from the host 10. In the read operation of the normal operation, the error detection circuit 240 may receive first to twentieth data DA1 to DA20 from the first to twentieth memory circuits DRAM1 to DRAM20. In the read operation of the normal operation, the error detection circuit 240 may generate the read data RDA by correcting an error included in the first to twentieth data DA1 to DA20. In the read operation of the normal operation, the error detection circuit 240 may output the read data RDA to the host 10. In the read operation and the read modify write operation, the error detection circuit 240 may generate a fail information signal FA_IF<1:M> (see FIG. 2) depending on whether an error has occurred in the first to twentieth data DA1 to DA20. Although each of the first to twentieth data DA1 to DA20 is illustrated as one signal, according to an embodiment, each of the first to twentieth data DA1 to DA20 may be set as a signal including a plurality of bits.

The signal transmission circuit 250 may include first to twentieth input/output circuits I/O1 to I/O20. In the write operation and the read operation of the normal operation, the signal transmission circuit 250 may input and output the first to twentieth data DA1 to DA20 to and from the first to twentieth memory circuits DRAM1 to DRAM20. In the read operation of the normal operation, the signal transmission circuit 250 may receive first to twentieth strobe signals DQS1 to DQS20 from the first to twentieth memory circuits DRAM1 to DRAM20. In the patrol training operation, the signal transmission circuit 250 may delay the first to twentieth strobe signals DQS1 to DQS20 by adjusted delay amounts. In the patrol training operation, the signal transmission circuit 250 may sample the first to twentieth data DA1 to DA20 in synchronization with the delayed first to twentieth strobe signals DQS1 to DQS20.

In the write operation and the read modify write operation, the first to twentieth memory circuits DRAM1 to DRAM20 may receive the first to twentieth data DA1 to DA20 from the first to twentieth input/output circuits I/O1 to I/O20. In the write operation and the read modify write operation, the first to twentieth memory circuits DRAM1 to DRAM20 may store the first to twentieth data DA1 to DA20. In the read operation and the read modify write operation, the first to twentieth memory circuits DRAM1 to DRAM20 may output the first to twentieth data DA1 to DA20 stored therein to the first to twentieth input/output circuits I/O1 to I/O20.

The controller 20 and the first to twentieth memory circuits DRAM1 to DRAM20 may be implemented as a dual in-line memory module (DIMM).

Figure 2:
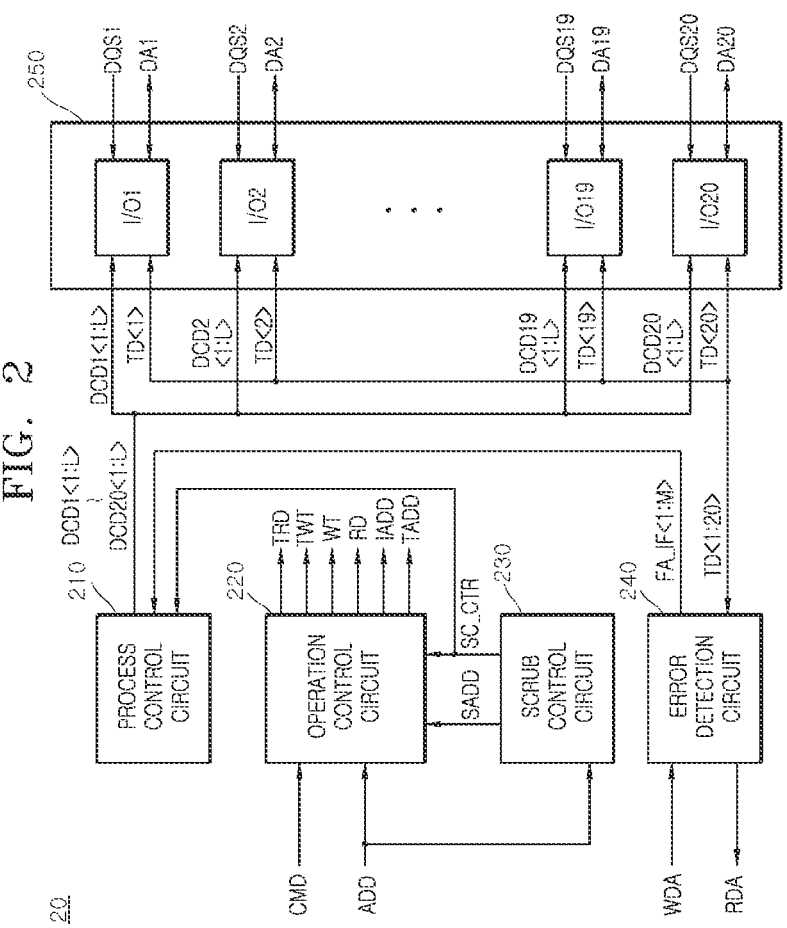
FIG. 2 is a block diagram illustrating a configuration of a controller included in the semiconductor system illustrated in FIG. 1.

FIG. 2 is a block diagram illustrating an embodiment of the controller 20. As illustrated in FIG. 2, the controller 20 may include the process control circuit 210, the operation control circuit 220, the scrub control circuit 230, the error detection circuit 240 and the signal transmission circuit 250.

The process control circuit 210 may determine the patrol training operation during the write operation and the read operation. In the patrol training operation, the process control circuit 210 may adjust the delay amounts of delay cells 251 (see FIG. 9) which are coupled to the first to twentieth memory circuits DRAM1 to DRAM20. During the patrol training operation, the process control circuit 210 may adjust first to twentieth delay code signals DCD1<1:L> to DCD20<1:L> for adjusting the delay amounts, respectively, of the delay cells 251 (see FIG. 9) included in the first to twentieth input/output circuits I/O1 to I/O20. As used herein, the tilde "~" indicates a range of components. For example, "DCD1<1:L>~DCD20<1:L>" as shown in FIG. 2 indicates the first to twentieth delay code signals DCD1<1:L> to DCD20<1:L>. During the patrol training operation, the process control circuit 210 may down count or up count the first to twentieth delay code signals DCD1<1:L> to DCD20<1:L> for adjusting the delay amounts, respectively, of the delay cells 251 (see FIG. 9) included in the first to twentieth input/output circuits I/O1 to I/O20, and then, may fix the first to twentieth delay code signals DCD1<1:L> to DCD20<1:L> on the basis of the fail information signal FA_IF<1:M>. During the patrol training operation, when down counting the first to twentieth delay code signals DCD1<1:L> to DCD20<1:L>, the process control circuit 210 may down count one time the first to twentieth delay code signals DCD1<1:L> to DCD20<1:L> after performing twice the read modify write operation on the basis of the fail information signal FA_IF<1:M>. This is to distinguish, during the read modify write operation, a case where an error occurs in the first to twentieth data DA1 to DA20 and a case where an error occurs in the signal transmission circuit 250. For example, in the case where an error has occurred in the first data DA1, since it is not a case where an error occurs in the signal transmission circuit 250, the process control circuit 210 may maintain the first delay code signal DCD1<1:L>, may then perform the read modify write operation again, and when there is no error on the basis of the fail information signal FA_IF<1:M>, may down count one time the first delay code signal DCD1<1:L>. During the patrol training operation, when up counting the first to twentieth delay code signals DCD1<1:L> to DCD20<1:L>, the process control circuit 210 may up count one time the first to twentieth delay code signals DCD1<1:L> to DCD20<1:L> after performing twice the read modify write operation on the basis of the fail information signal FA_IF<1:M>. This is to distinguish, during the read modify write operation, a case where an error occurs in the first to twentieth data DA1 to DA20 and a case where an error occurs in the signal transmission circuit 250. For example, in the case where an error has occurred in the first data DA1, since it is not a case where an error occurs in the signal transmission circuit 250, the process control circuit 210 may maintain the first delay code signal DCD1<1:L>, may then perform the read modify write operation again, and when there is no error on the basis of the fail information signal FA_IF<1:M>, may up count one time the first delay code signal DCD1<1:L>. The process control circuit 210 may be implemented as a central processing unit (CPU) which is used in a semiconductor system.

The operation control circuit 220 may generate a write signal WT when a logic level combination of the command CMD is a combination for performing the write operation of the normal operation. The operation control circuit 220 may generate an internal address IADD from the address ADD when a logic level combination of the command CMD is a combination for performing the write operation of the normal operation. The operation control circuit 220 may generate a read signal RD when a logic level combination of the command CMD is a combination for performing the read operation of the normal operation. The operation control circuit 220 may generate the internal address IADD from the address ADD when a logic level combination of the command CMD is a combination for performing the read operation of the normal operation. When a logic level combination of the command CMD is a combination for performing the normal operation and the patrol training operation is performed, the operation control circuit 220 may generate, from the command CMD, a training read signal TRD and a training write signal TWT which are sequentially generated. The operation control circuit 220 may generate the training address TADD by receiving the scrub address SADD from the scrub control circuit 230. The operation control circuit 220 may output the write signal WT, the read signal RD, the internal address IADD, the training read signal TRD, the training write signal TWT and the training address TADD to the first to twentieth memory circuits DRAM1 to DRAM20.

The scrub control circuit 230 may store the address ADD, and may generate the scrub address SADD from the stored address ADD. When the patrol training operation is performed during the normal operation, the scrub control circuit 230 may store the address ADD, and may generate the scrub address SADD from the stored address ADD. When the patrol training operation is performed during the normal operation, the scrub control circuit 230 may sequentially store a preset number of addresses ADD, and may sequentially generate scrub addresses SADD from the sequentially stored addresses ADD. For example, the scrub control circuit 230 may sequentially store addresses ADD for selecting the first memory circuit DRAM1, the third memory circuit DRAM3, the fifth memory circuit DRAM5 and the seventh memory circuit DRAM7, and then, may sequentially generate scrub addresses SADD for selecting the first memory circuit DRAM1, the third memory circuit DRAM3, the fifth memory circuit DRAM5 and the seventh memory circuit DRAM7. In the read modify write operation, the scrub control circuit 230 may output the scrub address SADD of the same logic level combination for the read operation and the write operation. In the patrol training operation during the normal operation, the scrub control circuit 230 may generate the scrub control signal SC_CTR when the number of stored addresses ADD reaches a preset value. For example, when the preset value is implemented to store four addresses ADD, the scrub control circuit 230 may generate the scrub control signal SC_CTR when addresses ADD for selecting the first memory circuit DRAM1, the third memory circuit DRAM3, the fifth memory circuit DRAM5 and the seventh memory circuit DRAM7 are stored.

In the write operation of the normal operation, the error detection circuit 240 may generate first to twentieth transfer data TD<1:20> from the write data WDA. In the write operation of the normal operation, the error detection circuit 240 may output the first to twentieth transfer data TD<1:20> to the first to twentieth memory circuits DRAM1 to DRAM20. In the read operation of the normal operation, the error detection circuit 240 may detect an error of first to twentieth transfer data TD<1:20> received from the first to twentieth memory circuits DRAM1 to DRAM20. In the read operation of the normal operation, the error detection circuit 240 may generate the read data RDA by correcting an error included in the first to twentieth transfer data TD<1:20>. In the read operation of the normal operation, the error detection circuit 240 may output the read data RDA to the host 10. In the read modify write operation, the error detection circuit 240 may receive the first to twentieth transfer data TD<1:20> from the first to twentieth memory circuits DRAM1 to DRAM20, and may detect an error of the first to twentieth transfer data TD<1:20>. In the read modify write operation, the error detection circuit 240 may output the error-corrected first to twentieth transfer data TD<1:20> as the first to twentieth data DA1 to DA20. In the read operation of the normal operation and the read modify write operation, the error detection circuit 240 may generate the fail information signal FA_IF<1:M> depending on whether an error has occurred in the first to twentieth transfer data TD<1:20>. The bits of the fail information signal FA_IF<1:M> may be generated at logic high levels when no error occurs in the first to twentieth transfer data TD<1:20>, and the bits of the fail information signal FA_IF<1:M> may be generated at logic low levels when an error occurs in the first to twentieth transfer data TD<1:20>.

The signal transmission circuit 250 may include the first to twentieth input/output circuits I/O1 to I/O20.

The first input/output circuit I/O1 may delay the first strobe signal DQS1 by a delay amount adjusted according to the first delay code signal DCD1<1:L>. In the patrol training operation during the read operation, the first input/output circuit I/O1 may delay the first strobe signal DQS1 by a delay amount adjusted according to the first delay code signal DCD1<1:L>. In the patrol training operation during the read operation, the first input/output circuit I/O1 may generate the first transfer data TD1 by sampling the first data DA1 in synchronization with the delayed first strobe signal DQS1. In the patrol training operation during the write operation, the first input/output circuit I/O1 may delay the first strobe signal DQS1 by a delay amount adjusted according to the first delay code signal DCD1<1:L>. During the write operation, the first input/output circuit I/O1 may generate the first data DA1 by sampling the first transfer data TD1 in synchronization with the delayed first strobe signal DQS1. In the patrol training operation during the read modify write operation, the first input/output circuit I/O1 may delay the first strobe signal DQS1 by a delay amount adjusted according to the first delay code signal DCD1<1:L>. In the patrol training operation during the read modify write operation, the first input/output circuit I/O1 may generate the first transfer data TD1 by sampling the first data DA1 in synchronization with the delayed first strobe signal DQS1. In the patrol training operation during the read modify write operation, the first input/output circuit I/O1 may generate the first data TD1 by sampling the first transfer data TD1 in synchronization with the delayed first strobe signal DQS1. Since the second to twentieth input/output circuits I/O2 to I/O20 perform the same operations as the first input/output circuit I/O1 except that input/output signals are different, detailed description thereof will be omitted herein. The first to twentieth input/output circuits I/O1 to I/O20 are implemented to delay the first to twentieth strobe signals DQS1 to DQS20 by delay amounts adjusted according to the first to twentieth delay code signals DCD1<1:L> to DCD20<1:L>. However, according to an embodiment, the first to twentieth input/output circuits I/O1 to I/O20 may be implemented to delay the first to twentieth data DA1 to DA20 by delay amounts adjusted according to the first to twentieth delay code signals DCD1<1:L> to DCD20<1:L>.

In the write operation of the normal operation or the read modify write operation, the signal transmission circuit 250 may output the first to twentieth data DA1 to DA20, generated from the first to twentieth transfer data TD<1:20>, to the first to twentieth memory circuits DRAM1 to DRAM20. In the write operation of the normal operation or the read modify write operation, the signal transmission circuit 250 may delay the first to twentieth strobe signals DQS1 to DQS20 by adjusted delay amounts. In the write operation of the normal operation or the read modify write operation, the signal transmission circuit 250 may generate the first to twentieth data DA1 to DA20 by sampling the first to twentieth transfer data TD<1:20> in synchronization with the delayed first to twentieth strobe signals DQS1 to DQS20. In the read operation of the normal operation or the read modify write operation, the signal transmission circuit 250 may output the first to twentieth transfer data TD<1:20>, generated from the first to twentieth data DA1 to DA20, to the error detection circuit 240. In the read operation of the normal operation or the read modify write operation, the signal transmission circuit 250 may delay the first to twentieth strobe signals DQS1 to DQS20 by adjusted delay amounts. In the read operation of the normal operation or the read modify write operation, the signal transmission circuit 250 may generate the first to twentieth transfer data TD<1:20> by sampling the first to twentieth data DA1 to DA20 in synchronization with the delayed first to twentieth strobe signals DQS1 to DQS20.

The controller 20 is implemented to include the process control circuit 210, the operation control circuit 220, the scrub control circuit 230, the error detection circuit 240 and the signal transmission circuit 250. However, according to an embodiment, the host 10 may be implemented to include the process control circuit 210, the operation control circuit 220, the scrub control circuit 230, the error detection circuit 240 and the signal transmission circuit 250.

Figure 3:
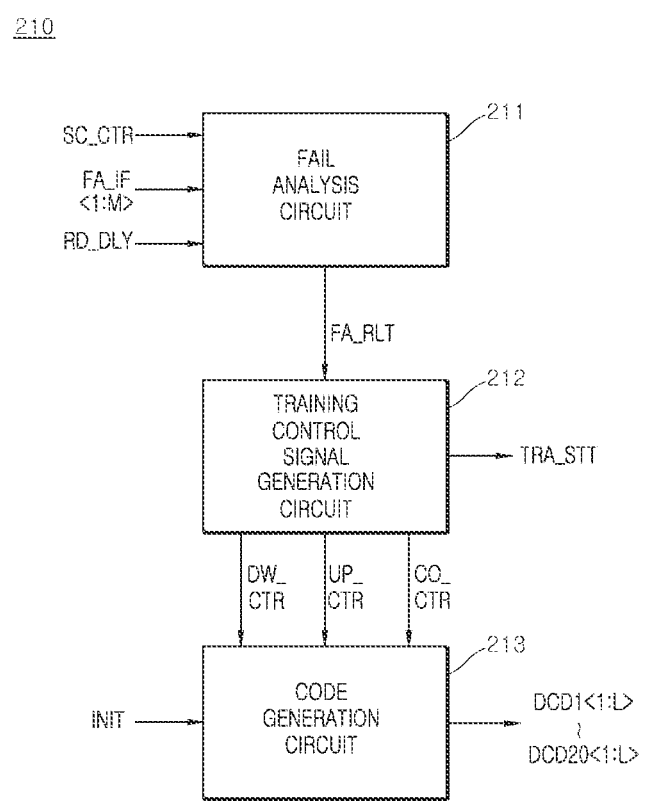
FIG. 3 is a block diagram illustrating a configuration of a process control circuit included in the controller illustrated in FIG. 2.

FIG. 3 is a block diagram illustrating an embodiment of the process control circuit 210. As illustrated in FIG. 3, the process control circuit 210 may include a fail analysis circuit 211, a training control signal generation circuit 212 and a code generation circuit 213.

The fail analysis circuit 211 may analyze whether a fail has occurred in the training address TADD, on the basis of the fail information signal FA_IF<1:M> when the scrub control signal SC_CTR is input. When the fail information signal FA_IF<1:M> is generated, the fail analysis circuit 211 may detect a case where a fail has occurred in the first to twentieth transfer data TD<1:20> which are generated by the training address TADD. When the fail information signal FA_IF<1:M> is not generated, the fail analysis circuit 211 may detect that no fail has occurred in the first to twentieth transfer data TD<1:20> which are generated by the training address TADD. The fail analysis circuit 211 may generate a fail analysis result signal FA_RLT which is enabled in the case where the fail information signal FA_IF<1:M> is generated when the scrub control signal SC_CTR is input. The fail analysis circuit 211 may generate the fail analysis result signal FA_RLT which is disabled in the case where the fail information signal FA_IF<1:M> is not generated when the scrub control signal SC_CTR is input. The fail analysis circuit 211 may analyze whether a fail has occurred in the training address TADD, on the basis of the fail information signal FA_IF<1:M> when a read delay signal RD_DLY is input. The fail analysis circuit 211 may generate the fail analysis result signal FA_RLT which is enabled in the case where the fail information signal FA_IF<1:M> is generated when the read delay signal RD_DLY is input. The fail analysis circuit 211 may generate the fail analysis result signal FA_RLT which is disabled in the case where the fail information signal FA_IF<1:M> is not generated when the read delay signal RD_DLY is input. The read delay signal RD_DLY is a signal which is obtained as the read signal RD for the read operation is delayed. A delay amount by which the read delay signal RD_DLY is delayed may be set from a time point when the read signal RD is generated to a time point when the read operation is completed.

The training control signal generation circuit 212 may generate a training start signal TRA_STT for performing patrol training. The training control signal generation circuit 212 may receive the fail analysis result signal FA_RLT, and thereby, may generate a down control signal DW_CTR and an up control signal UP_CTR. The training control signal generation circuit 212 may generate the down control signal DW_CTR and the up control signal UP_CTR when the fail analysis result signal FA_RLT is enabled. When the fail analysis result signal FA_RLT is enabled, the training control signal generation circuit 212 may generate the down control signal DW_CTR and then generate the up control signal UP_CTR. According to an embodiment, the training control signal generation circuit 212 may be implemented to, when the fail analysis result signal FA_RLT is enabled, generate the up control signal UP_CTR and then generate the down control signal DW_CTR. The training control signal generation circuit 212 may generate a code output control signal CO_CTR when the fail analysis result signal FA_RLT is disabled.

The code generation circuit 213 may generate the first to twentieth delay code signals DCD1<1:L> to DCD20<1:L> which have initial values when an initialization signal INIT is input. The first to twentieth delay code signals DCD1<1:L> to DCD20<1:L> which have the initial values may have logic level combinations for adjusting the delay amounts of the first to twentieth input/output circuits I/O1 to I/O20 to middle values. The code generation circuit 213 may sequentially down count the first delay code signal DCD1<1:L> when the down control signal DW_CTR is input. The code generation circuit 213 may sequentially up count the first delay code signal DCD1<1:L> when the up control signal UP_CTR is input. When the code output control signal CO_CTR is input, the code generation circuit 213 may fix the first delay code signal DCD1<1:L> to a middle value between a minimum value to which the first delay code signal DCD1<1:L> is down counted and a maximum value to which the first delay code signal DCD1<1:L> is up counted. After fixing the first delay code signal DCD1<1:L>, the code generation circuit 213 may perform down counting and up counting of the second to twentieth delay code signals DCD2<1:L> to DCD20<1:L>, and may fix the second to twentieth delay code signals DCD2<1:L> to DCD20<1:L>.

The code generation circuit 213 may generate the first to twentieth delay code signals DCD1<1:L> to DCD20<1:L> which have the initial values, in an operation of performing an initialization operation and a boot-up operation in which the semiconductor system 1 starts to operate. The initial values of the first to twentieth delay code signals DCD1<1: L> to DCD20<1: L> may be generated through a fuse circuit in the boot-up operation of the semiconductor system 1. For example, when the first delay code signal DCD1<1:4> of 4 bits is generated, the initial value of the first delay code signal DCD1<1:4> may be set to a combination (L, H, H, H) as a middle value between a combination (L, L, L, L) in which all bits of the first delay code signal DCD1<1:4> are logic low levels and a combination (H, H, H, H) in which all bits of the first delay code signal DCD1<1:4> are logic high levels. The combination (L, L, L, L) of the first delay code signal DCD1<1:4> means that a first bit DCD1<1> of the first delay code signal DCD1<1:4> is a logic low level L, a second bit DCD1<2> of the first delay code signal DCD1<1: 4> is a logic low level L, a third bit DCD1<3> of the first delay code signal DCD1<1:4> is a logic low level L and a fourth bit DCD1<4> of the first code signal DCD1<1:4> is a logic low level L. The combination (H, H, H, H) of the first delay code signal DCD1<1:4> means that the first bit DCD1<1> of the first delay code signal DCD1<1:4> is a logic high level H, the second bit DCD1<2> of the first delay code signal DCD1<1:4> is a logic high level H, the third bit DCD1<3> of the first delay code signal DCD1<1:4> is a logic high level H and the fourth bit DCD1<4> of the first code signal DCD1<1:4> is a logic high level H. The combination (L, H, H, H) of the first delay code signal DCD1<1:4> means that the first bit DCD1<1> of the first delay code signal DCD1<1:4> is a logic high level H, the second bit DCD1<2> of the first delay code signal DCD1<1: 4> is a logic high level H, the third bit DCD1<3> of the first delay code signal DCD1<1:4> is a logic high level H and the fourth bit DCD1<4> of the first code signal DCD1<1:4> is a logic low level L.

Figure 4:
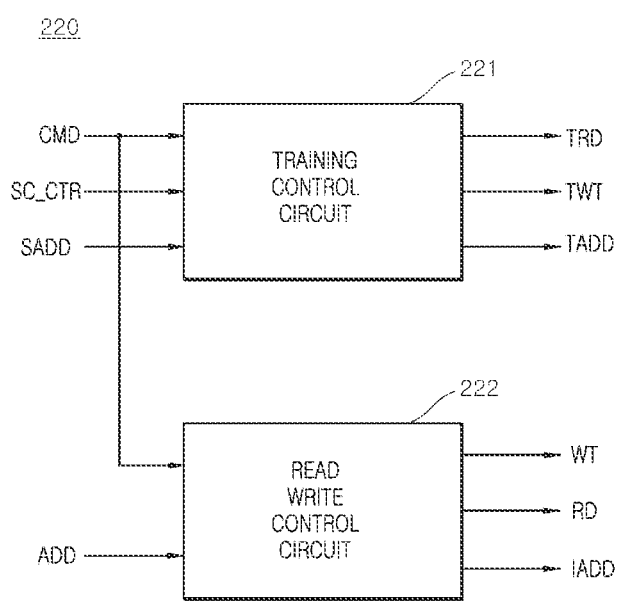
FIG. 4 is a block diagram illustrating a configuration of an operation control circuit included in the controller illustrated in FIG. 2.

FIG. 4 is a block diagram illustrating an embodiment of the operation control circuit 220. As illustrated in FIG. 4, the operation control circuit 220 may include a training control circuit 221 and a read write control circuit 222.

In the patrol training operation during the normal operation, the training control circuit 221 may generate the training read signal TRD and the training write signal TWT for performing the read modify write operation. When the command CMD has a logic level combination for performing the normal operation and the scrub control signal SC_CTR is input, the training control circuit 221 may generate the training read signal TRD and the training write signal TWT which are sequentially generated to perform the read modify write operation. When the scrub control signal SC_CTR is input, the training control circuit 221 may generate the training address TADD by receiving the scrub address SADD. When the scrub control signal SC_CTR is input, the training control circuit 221 may output the scrub address SADD as the training address TADD. The training control circuit 221 may output the training read signal TRD, the training write signal TWT and the training address TADD to the first to twentieth memory circuits DRAM1 to DRAM20.

The read write control circuit 222 may generate the write signal WT and the internal address IADD for performing the write operation in the normal operation. The read write control circuit 222 may generate the read signal RD and the internal address IADD for performing the read operation in the normal operation. When the command CMD is a logic level combination for performing the write operation during the normal operation, the read write control circuit 222 may generate the write signal WT. When the command CMD is the logic level combination for performing the write operation during the normal operation, the read write control circuit 222 may generate the internal address IADD from the address ADD. When the command CMD is a logic level combination for performing the read operation during the normal operation, the read write control circuit 222 may generate the read signal RD. When the command CMD is the logic level combination for performing the read operation during the normal operation, the read write control circuit 222 may generate the internal address IADD from the address ADD. The read write control circuit 222 may output the write signal WT, the read signal RD and the internal address IADD to the first to twentieth memory circuits DRAM1 to DRAM20.

Figure 5:
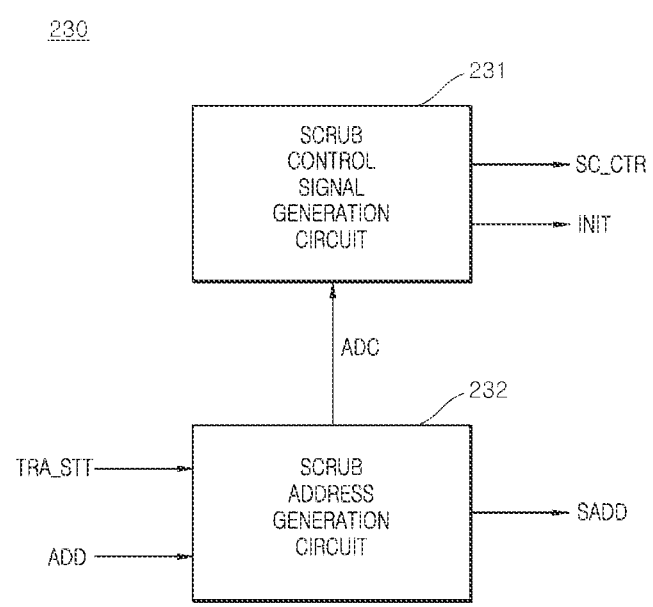
FIG. 5 is a block diagram illustrating a configuration of a scrub control circuit included in the controller illustrated in FIG. 2.

FIG. 5 is a block diagram illustrating an embodiment of the scrub control circuit 230. As illustrated in FIG. 5, the scrub control circuit 230 may include a scrub control signal generation circuit 231 and a scrub address generation circuit 232.

The scrub control signal generation circuit 231 may generate the scrub control signal SC_CTR which is generated when an address storage completion signal ADC is input during the normal operation. The scrub control signal generation circuit 231 may generate the initialization signal INIT which is generated when the address storage completion signal ADC is input.

The scrub address generation circuit 232 may be implemented by a plurality of latch circuits (not illustrated). The scrub address generation circuit 232 may store the address ADD when the training start signal TRA_STT is input. During the normal operation, the scrub address generation circuit 232 may generate the address storage completion signal ADC when the number of addresses ADD of different logic level combinations reaches a preset value. The scrub address generation circuit 232 may output the stored addresses ADD as the scrub address SADD. The addresses ADD of different logic level combinations stored in the scrub address generation circuit 232 may be set as addresses ADD for selecting target memory circuits for performing the read modify write operation among the first to twentieth memory circuits DRAM1 to DRAM20. For example, the scrub address generation circuit 232 may store four addresses ADD for selecting the first memory circuit DRAM1, the third memory circuit DRAM3, the fifth memory circuit DRAM5 and the seventh memory circuit DRAM7. The scrub address generation circuit 232 may generate the address storage completion signal ADC when the storage of the four addresses ADD is completed. In the read modify write operation, the scrub address generation circuit 232 may generate the scrub address SADD from the stored address ADD. For example, in the read modify write operation, the scrub address generation circuit 232 may store the address ADD for selecting the first memory circuit DRAM1, and may output the stored address ADD as the scrub address SADD. In the read modify write operation, after outputting the address ADD for selecting the first memory circuit DRAM1 as the scrub address SADD, the scrub address generation circuit 232 may sequentially output the addresses ADD for selecting the third memory circuit DRAM3, the fifth memory circuit DRAM5 and the seventh memory circuit DRAM7 as the scrub addresses SADD. In the read modify write operation, the scrub address generation circuit 232 may output the scrub addresses SADD of the same logic level combination to perform the read operation and the write operation for the same memory circuit.

Figure 6:
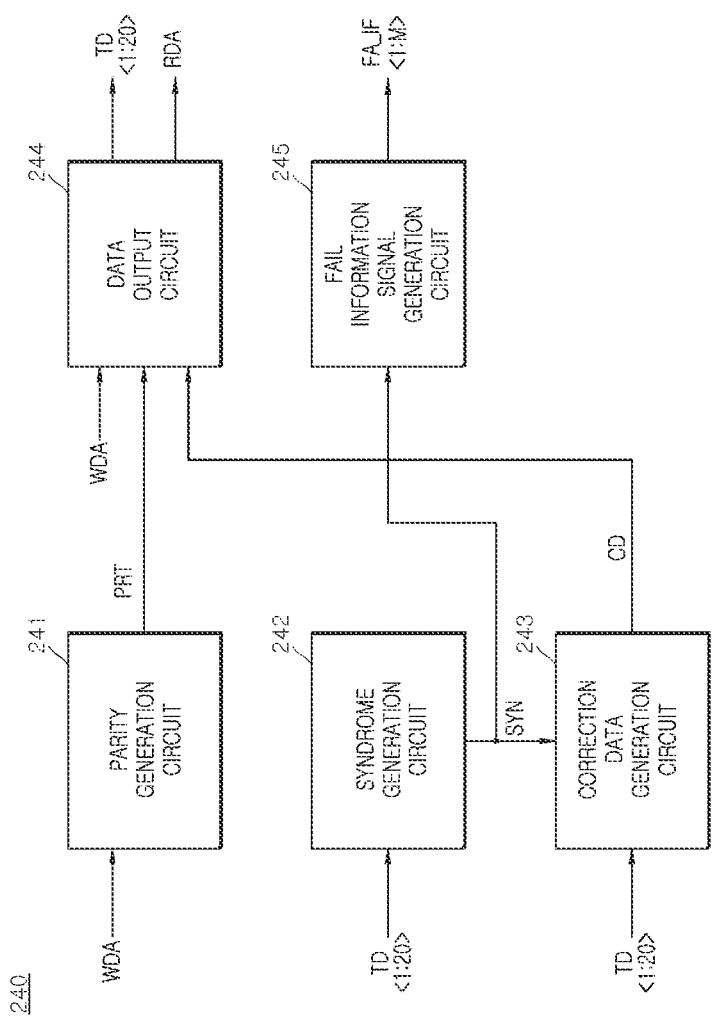
FIG. 6 is a block diagram illustrating a configuration of an error detection circuit included in the controller illustrated in FIG. 2.

FIG. 6 is a block diagram illustrating an embodiment of the error detection circuit 240. As illustrated in FIG. 6, the error detection circuit 240 may include a parity generation circuit 241, a syndrome generation circuit 242, a correction data generation circuit 243, a data output circuit 244 and a fail information signal generation circuit 245.

In the write operation during the normal operation, the parity generation circuit 241 may generate a parity PRT by performing an ECC encoding operation on the write data WDA. In the write operation during the normal operation, the parity generation circuit 241 may generate the parity PRT including information on an error included in the write data WDA, by performing the ECC encoding operation on the write data WDA. While the parity PRT is illustrated as one signal, it is to be noted that, according to an embodiment, the parity PRT may be set as a signal including a plurality of bits.

In the read operation and the read modify write operation during the normal operation, the syndrome generation circuit 242 may generate a syndrome SYN by performing an ECC decoding operation on a parity included in the first to twentieth transfer data TD<1:20>. While the syndrome SYN is illustrated as one signal, it is to be noted that, according to an embodiment, the syndrome SYN may be set as a signal including a plurality of bits.

In the read operation and the read modify write operation during the normal operation, the correction data generation circuit 243 may generate correction data CD by correcting an error of the first to twentieth transfer data TD<1:20> by performing an ECC decoding operation on the basis of the syndrome SYN.

The ECC encoding operation includes an operation of generating a parity by comparing data including a plurality of bits in a general error correction circuit (ECC). The ECC decoding operation includes an operation of generating a syndrome by comparing a previously generated parity and the parity generated by comparing the data including the plurality of bits, identifying a location of an error of the data by using the generated syndrome and correcting the error having a location that has been identified, in the general error correction circuit (ECC).

In the write operation during the normal operation, the data output circuit 244 may output the first to twentieth transfer data TD<1:20> by synthesizing the write data WDA and the parity PRT generated from the write data WDA. In the read operation during the normal operation, the data output circuit 244 may output the correction data CD which is obtained as the error of the first to twentieth transfer data TD<1:20> is corrected, as the read data RDA. In the read modify write operation during the normal operation, the data output circuit 244 may output again the correction data CD which is obtained as the error of the first to twentieth transfer data TD<1:20> is corrected, as the first to twentieth transfer data TD<1:20>. The operation of generating the first to twentieth transfer data TD<1:20> by the data output circuit 244 in the write operation during the normal operation will be described later with reference to FIG. 7.

In the read operation and the read modify write operation during the normal operation, the fail information signal generation circuit 245 may generate the fail information signal FA_IF<1:M> on the basis of the syndrome SYN. In the read operation and the read modify write operation during the normal operation, when there is no error in the first to twentieth transfer data TD<1:20>, the fail information signal generation circuit 245 may sequentially store a signal of a logic high level as the fail information signal FA_IF<1:M>. In the read operation and the read modify write operation during the normal operation, when there is an error in the first to twentieth transfer data TD<1:20>, the fail information signal generation circuit 245 may sequentially store a signal of a logic low level as the fail information signal FA_IF<1:M>. The operation of generating the fail information signal FA_IF<1:M> in the fail information signal generation circuit 245 will be described later with reference to FIG. 8.

Figure 7:
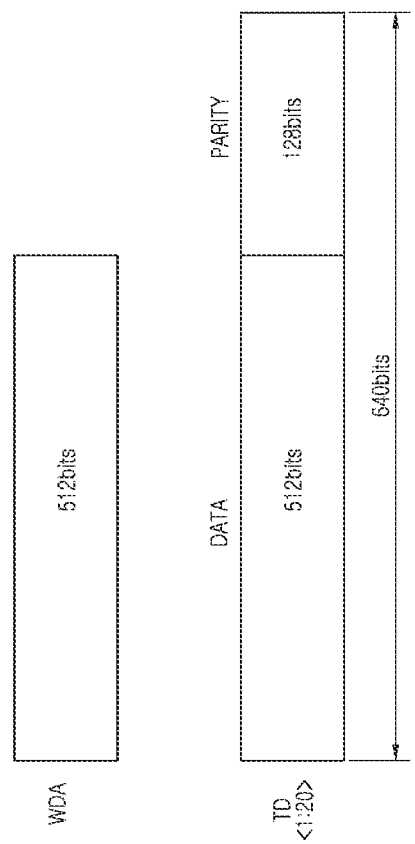
FIG. 7 is a diagram for explaining data input and output through a signal transmission circuit in accordance with the embodiment of the present disclosure.

FIG. 7 is a diagram for explaining data input and output through a signal transmission circuit in accordance with the embodiment of the present disclosure.

The write data WDA may be input from the host 10 while including 512 bits.

The error detection circuit 240 of the controller 20 generates data of 574 bits including data of 512 bits of the write data WDA and 62 bits having a previously promised value of "0," and defines 82 symbols by dividing 574 bits by 7 bits. The error detection circuit 240 generates a parity of 119 bits by calculating a polynomial X(n) generated using 82 symbols and a Read Solomon code algorithm, and generates dummy bits of 9 bits. That is to say, the error detection circuit 240 generates a parity of 128 bits. The error detection circuit 240 generates the first to twentieth transfer data TD<1:20> of 640 bits by synthesizing the parity of 128 bits and the write data WDA. The numbers of bits of the write data WDA and the first to twentieth transfer data TD<1:20> may be set to various numbers depending on an embodiment.

Figure 8:
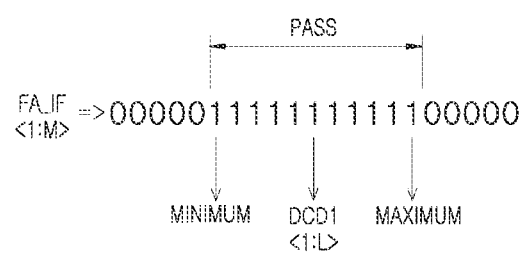
FIG. 8 is a diagram for explaining an operation for generating a delay code signal in accordance with the embodiment of the present disclosure.

FIG. 8 is a diagram for explaining an operation for generating a first delay code signal in accordance with the embodiment of the present disclosure.

In a period PASS during which the fail information signal FA_IF<1:M> is enabled to a logic high level, the first delay code signal DCD1<1:L> is generated as a logic level combination of a time point when 11 bits are generated as a middle value between a sixth bit as a minimum value obtained as the first delay code signal DCD1<1:L> is down counted and a sixteenth bit as a maximum value obtained as the first delay code signal DCD1<1:L> is up counted. The first delay code signal DCD1<1:L> is generated as a logic level combination having the middle value of the period PASS in which the fail information signal FA_IF<1:M> is enabled to a logic high level. At this time, the first delay code signal DCD1<1:L> is set as an optimal value.

Figure 9:
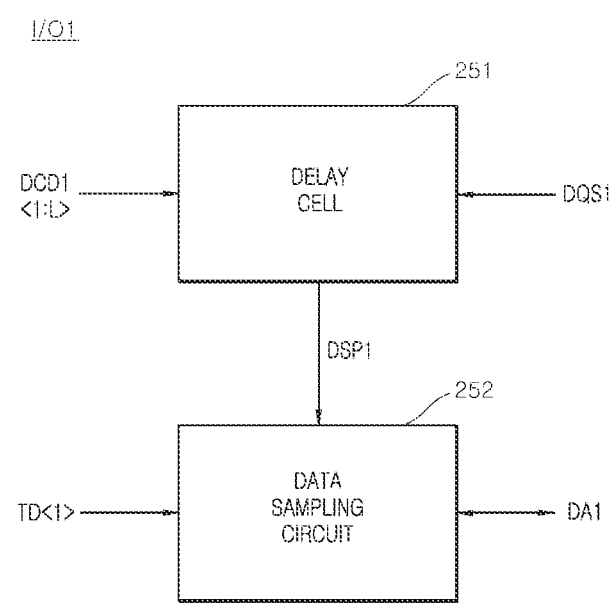
FIG. 9 is a block diagram illustrating a configuration of a first input/output circuit included in the signal transmission circuit illustrated in FIG. 2.

FIG. 9 is a block diagram illustrating an embodiment of the first input/output circuit I/O1. As illustrated in FIG. 9, the first input/output circuit I/O1 may include the delay cell 251 and a data sampling circuit 252.

A delay amount of the delay cell 251 may be adjusted depending on a logic level combination of the first delay code signal DCD1<1:L>. The delay cell 251 may generate a first sampling signal DSP1 by delaying the first strobe signal DQS1 by a delay amount adjusted by the first delay code signal DCD1<1:L>, A delay amount of the delay cell 251 may be sequentially decreased each time the first delay code signal DCD1<1:L> is down counted. A delay amount of the delay cell 251 may be sequentially increased each time the first delay code signal DCD1<1:L> is up counted.

In the write operation of the normal operation and the read modify write operation, the data sampling circuit 252 may generate the first data DA1 by sampling the first transfer data TD<1> in synchronization with the first sampling signal DSP1. In the write operation of the normal operation and the read modify write operation, the data sampling circuit 252 may generate the first data DA1 by sampling the first transfer data TD<1>, input from the error detection circuit 240, in synchronization with the first sampling signal DSP1. In the write operation of the normal operation and the read modify write operation, the data sampling circuit 252 may output the first data DA1 to the first memory circuit DRAM1.

In the read operation of the normal operation and the read modify write operation, the data sampling circuit 252 may generate the first transfer data TD<1> by sampling the first data DA1 in synchronization with the first sampling signal DSP1. In the read operation of the normal operation and the read modify write operation, the data sampling circuit 252 may generate the first transfer data TD<1> by sampling the first data DA1, input from the first memory circuit DRAM1, in synchronization with the first sampling signal DSP1. In the read operation of the normal operation and the read modify write operation, the data sampling circuit 252 may output the first transfer data TD<1> to the error detection circuit 240.

Since the second to twentieth input/output circuits I/O2 to I/O20 illustrated in FIG. 2 are implemented by the same circuits and perform the same operations as the first input/output circuit I/O1 illustrated in FIG. 9, detailed description thereof will be omitted herein.

Figure 10:
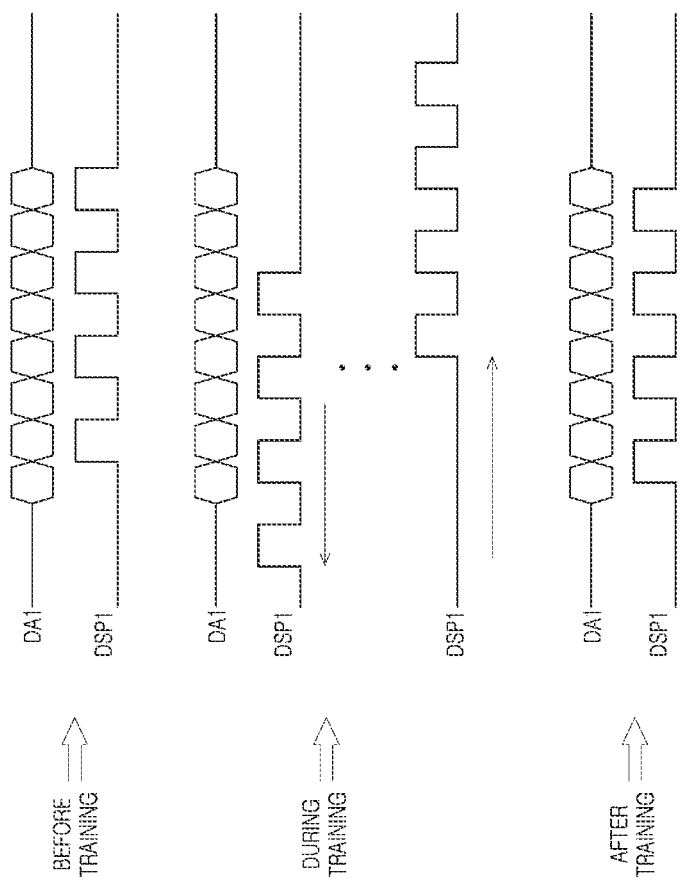
FIG. 10 is a timing diagram for explaining a patrol training operation in accordance with the embodiment of the present disclosure.

The patrol training operation in accordance with the embodiment of the present disclosure will be described below with reference to FIG. 10, by taking as an example the read operation for the first memory circuit DRAM1 during the normal operation.

Before the patrol training operation (BEFORE TRAINING), by observing the edge of the first data DA1 and the edge of the first sampling signal DSP1 generated from the first strobe signal DQS1, it may be seen that the logic level of the first data DA1 transitions at the edge of the first sampling signal DSP1. At this time, an error occurs in the first transfer data TD<1> which is generated from the first data DA1.

During the patrol training operation (DURING TRAINING), it may be seen that the first sampling signal DSP1 generated from the first strobe signal DQS1 is generated sequentially fast when the first delay code signal DCD1<1:L> is down counted and is generated sequentially slow when the first delay code signal DCD1<1:L> is up counted. During the patrol training operation (DURING TRAINING), the first sampling signal DSP1 generated faster when the first delay code signal DCD1<1:L> is down counted than when the first delay code signal DCD1<1:L> is up counted. During the patrol training operation (DURING TRAINING), the first sampling signal DSP1 generated more slowly when the first delay code signal DCD1<1:L> is up counted than when the first delay code signal DCD1<1:L> is down counted.

During the patrol training operation (DURING TRAINING), the error detection circuit 240 may sequentially generate the fail information signal FA_IF<1:M> depending on whether an error has occurred in the first transfer data TD<1> generated from the first data DA1 in synchronization with the first sampling signal DSP1 having a delay amount that is sequentially decreased when the first delay code signal DCD1<1:L> is down counted. The bits of the fail information signal FA_IF<1:M> are generated at logic high levels when no error occurs in the first transfer data TD<1>, and the bits of the fail information signal FA_IF<1:M> are generated at logic low levels when an error occurs in the first transfer data TD<1>.

During the patrol training operation (DURING TRAINING), the error detection circuit 240 may sequentially generate the fail information signal FA_IF<1:M> depending on whether an error has occurred in the first transfer data TD<1> generated from the first data DA1 in synchronization with the first sampling signal DSP1 having a delay amount that is sequentially increased when the first delay code signal DCD1<1:L> is up counted. The bits of the fail information signal FA_IF<1:M> are generated at logic high levels when no error occurs in the first transfer data TD<1>, and the bits of the fail information signal FA_IF<1:M> are generated at logic low levels when an error occurs in the first transfer data TD<1>.

After the patrol training operation (AFTER TRAINING), by observing the edge of the first data DA1 and the edge of the first sampling signal DSP1 generated from the first strobe signal DQS1, it may be seen that the logic level of the first data DA1 is maintained at the edge of the first sampling signal DSP1. At this time, no error occurs in the first transfer data TD<1> which is generated from the first data DA1. As described above with reference to FIG. 8, the first delay code signal DCD1<1:L> is generated as a logic level combination having the middle value of the period PASS in which the fail information signal FA_IF<1:M> is enabled to a logic high level. At this time, the first delay code signal DCD1<1:L> is set as an optimal value.

As is apparent from the above description, the semiconductor system in accordance with the embodiment of the present disclosure may perform a patrol training operation of adjusting a delay amount of a signal transmission circuit coupling a controller and a memory circuit during a write operation and a read operation. By performing the patrol training operation of adjusting a delay amount of the signal transmission circuit coupling the controller and the memory circuit during a write operation and a read operation, the semiconductor system in accordance with the embodiment of the present disclosure may secure the reliability of data input and output through the signal transmission circuit.

Figure 11:
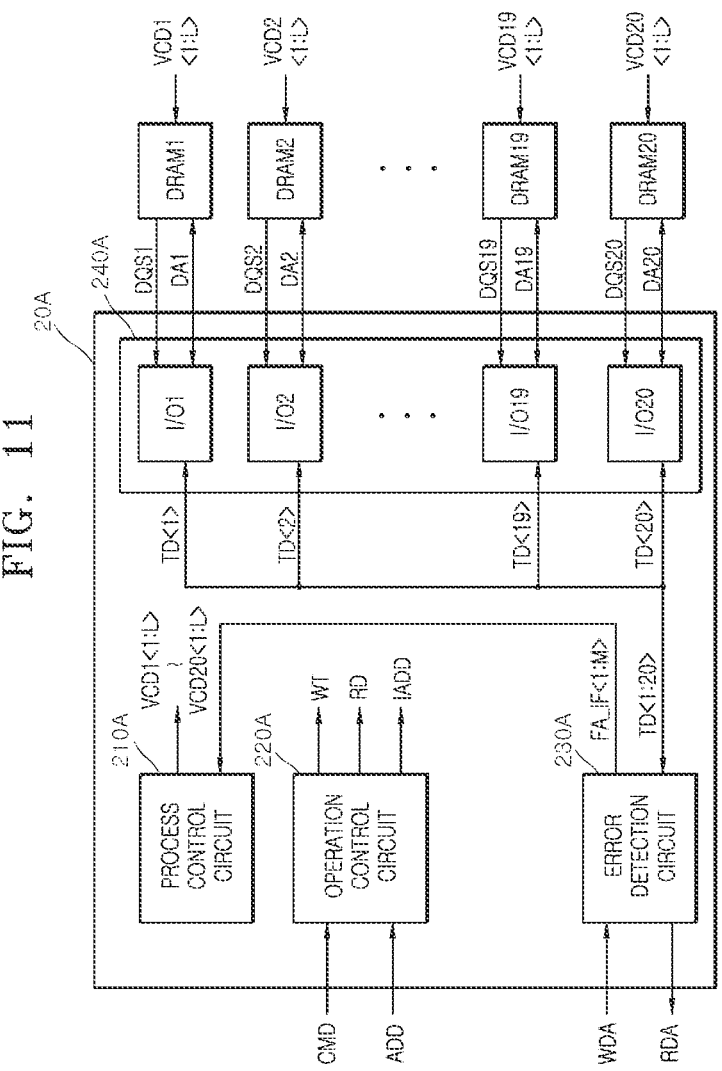
FIG. 11 is a block diagram illustrating configurations of a controller and memory circuits in accordance with another embodiment of the present disclosure.

FIG. 11 is a block diagram illustrating a controller 20A and first to twentieth memory circuits DRAM1 to DRAM20 in accordance with another embodiment of the present disclosure.

The controller 20A may include a process control circuit 210A, an operation control circuit 220A, an error detection circuit 230A and a signal transmission circuit 240A.

During a write operation and a read operation, the process control circuit 210A may determine a patrol training operation. In the patrol training operation, the process control circuit 210A may adjust the level of a reference voltage VREF (see FIG. 12) which is used in the first to twentieth memory circuits DRAM1 to DRAM20. During the patrol training operation, the process control circuit 210A may adjust first to twentieth voltage code signals VCD1<1:L> to VCD20<1:L> for adjusting the level of the reference voltage VREF (see FIG. 12) used in the respective first to twentieth memory circuits DRAM1 to DRAM20. During the patrol training operation, the process control circuit 210A may down count or up count the first to twentieth voltage code signals VCD1<1:L> to VCD20<1:L> for adjusting the level of the reference voltage VREF (see FIG. 12) used in the first to twentieth memory circuits DRAM1 to DRAM20, and then, may fix the first to twentieth voltage code signals VCD1<1:L> to VCD20<1:L> on the basis of a fail information signal FAIF<1:M>. The process control circuit 210A may be implemented by a circuit similar to the process control circuit 210 illustrated in FIG. 2, except that the process control circuit 210A generates the first to twentieth voltage code signals VCD1<1:L> to VCD20<1:L> instead of the first to twentieth delay code signals DCD1<1:L> to DCD20<1:L> generated by the process control circuit 210, and thus, a detailed description thereof will be omitted herein.

The operation control circuit 220A may generate a write signal WT when a logic level combination of a command CMD is a combination for performing the write operation of a normal operation. The operation control circuit 220A may generate an internal address IADD from an address ADD when a logic level combination of the command CMD is a combination for performing the write operation of the normal operation. The operation control circuit 220A may generate a read signal RD when a logic level combination of the command CMD is a combination for performing the read operation of the normal operation. The operation control circuit 220A may generate the internal address IADD from the address ADD when a logic level combination of the command CMD is a combination for performing the read operation of the normal operation. The operation control circuit 220A may output the write signal WT, the read signal RD and the internal address IADD to the first to twentieth memory circuits DRAM1 to DRAM20. Since the operation control circuit 220A is implemented by the same circuit and performs the same operation as the read write control circuit 222 illustrated in FIG. 4, a detailed description thereof will be omitted herein.

In the write operation of the normal operation, the error detection circuit 230A may generate first to twentieth transfer data TD<1:20> from the write data WDA. In the write operation of the normal operation, the error detection circuit 230A may output the first to twentieth transfer data TD<1:20> to the first to twentieth memory circuits DRAM1 to DRAM20. In the read operation of the normal operation, the error detection circuit 230A may receive the first to twentieth transfer data TD<1:20> from the first to twentieth memory circuits DRAM1 to DRAM20, and may detect an error of the first to twentieth transfer data TD<1:20>. In the read operation of the normal operation, the error detection circuit 230A may generate read data RDA by correcting an error included in the first to twentieth transfer data TD<1:20>. In the read operation of the normal operation, the error detection circuit 230A may output the read data RDA to a host 10 (see FIG. 1). In the read operation of the normal operation and a read modify write operation, the error detection circuit 230A may generate the fail information signal FA_IF<1:M> depending on whether an error has occurred in the first to twentieth transfer data TD<1:20>. The bits of the fail information signal FA_IF<1:M> may be generated at logic high levels when no error occurs in the first to twentieth transfer data TD<1:20>, and the bits of the fail information signal FA_IF<1:M> may be generated at logic low levels when an error occurs in the first to twentieth transfer data TD<1:20>. Since the error detection circuit 230A is implemented by the same circuit and performs the same operation as the error detection circuit 240 illustrated in FIG. 2, a detailed description thereof will be omitted herein.

The signal transmission circuit 240A may include first to twentieth input/output circuits I/O1 to I/O20.

During the read operation, the first input/output circuit I/O1 may generate the first transfer data TD1 by sampling first data DA1 in synchronization with a first strobe signal DQS1. During the write operation, the first input/output circuit I/O1 may generate the first data DA1 by sampling the first transfer data TD1 in synchronization with the first strobe signal DQS1. Since the second to twentieth input/output circuits I/O2 to I/O20 perform the same operations as the first input/output circuit I/O1 except that input/output signals are different, a detailed description thereof will be omitted herein.

In the write operation of the normal operation, the signal transmission circuit 240A may output first to twentieth data DA1 to DA20, generated from the first to twentieth transfer data TD<1:20>, to the first to twentieth memory circuits DRAM1 to DRAM20. In the write operation of the normal operation, the signal transmission circuit 240A may generate the first to twentieth data DA1 to DA20 by sampling the first to twentieth transfer data TD<1:20> in synchronization with first to twentieth strobe signals DQS1 to DQS20. In the read operation of the normal operation, the signal transmission circuit 240A may output the first to twentieth transfer data TD<1:20>, generated from the first to twentieth data DA1 to DA20, to the error detection circuit 230A. In the read operation of the normal operation, the signal transmission circuit 240A may generate the first to twentieth transfer data TD<1:20> by sampling the first to twentieth data DA1 to DA20 in synchronization with the first to twentieth strobe signals DQS1 to DQS20.

In the write operation of the normal operation, the first memory circuit DRAM1 may receive the first data DA1 from the first input/output circuit I/O1. In the write operation of the normal operation, the first memory circuit DRAM1 may store the first data DA1 as first internal data ID1 (see FIG. 12). In the read operation of the normal operation, the first memory circuit DRAM1 may adjust the level of the reference voltage VREF (see FIG. 12) depending on a logic level combination of the first voltage code signal VCD1<1:L>. In the read operation of the normal operation, the first memory circuit DRAM1 may generate the first data DA1 by comparing the level-adjusted reference voltage VREF (see FIG. 12) and the first internal data ID1 (see FIG. 12). In the read operation of the normal operation, the first memory circuit DRAM1 may output the first data DA1.

Since the second to twentieth memory circuits DRAM2 to DRAM20 are implemented by the same circuits and perform the same operations as the first memory circuit DRAM1, a detailed description thereof will be omitted herein.

Figure 12:
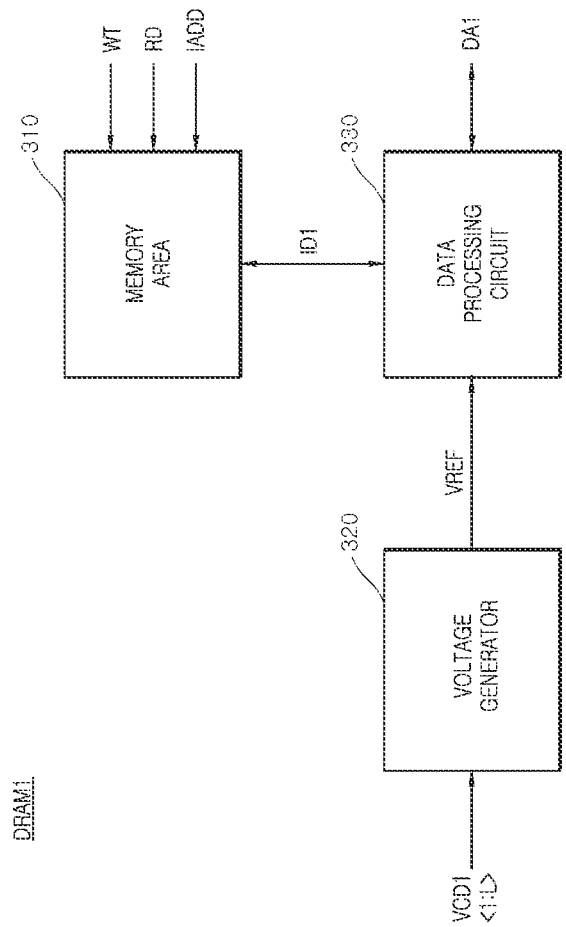
FIG. 12 is a block diagram illustrating a configuration of a first memory circuit illustrated in FIG. 11.

FIG. 12 is a block diagram illustrating an embodiment of the first memory circuit DRAM1. As illustrated in FIG. 12, the first memory circuit DRAM1 may include a memory area 310, a voltage generator 320 and a data processing circuit 330.

In the write operation during the normal operation, the memory area 310 may store the first internal data ID1. The memory area 310 may store the first internal data ID1 at a location selected by the internal address IADD when the write signal WT is input. In the read operation during the normal operation, the memory area 310 may output the first internal data ID1 stored therein. The memory area 310 may output the first internal data ID1 stored at a location selected by the internal address IADD when the read signal RD is input.

The voltage generator 320 may generate the reference voltage VREF for determining a logic level of data. In the read operation during the normal operation, the voltage generator 320 may generate the reference voltage VREF having a level that is adjusted depending on a logic level combination of the first voltage code signal VCD1<1:L>. The operation of adjusting the level of the reference voltage VREF in the voltage generator 320 depending on a logic level combination of the first voltage code signal VCD1<1:L> will be described later with reference to FIG. 13.

In the write operation during the normal operation, the data processing circuit 330 may generate the first internal data ID1 from the first data DA1. In the write operation during the normal operation, the data processing circuit 330 may generate the first internal data ID1 by comparing the reference voltage VREF and the first data DA1. In the read operation during the normal operation, the data processing circuit 330 may generate the first data DA1 from the first internal data ID1. In the read operation during the normal operation, the data processing circuit 330 may generate the first data DA1 by comparing the reference voltage VREF and the first internal data ID1.

Since the second to twentieth memory circuits DRAM2 to DRAM20 illustrated in FIG. 11 are implemented by the same circuits and perform the same operations as the first memory circuit DRAM1 illustrated in FIG. 12, detailed description thereof will be omitted herein.

Figure 13:
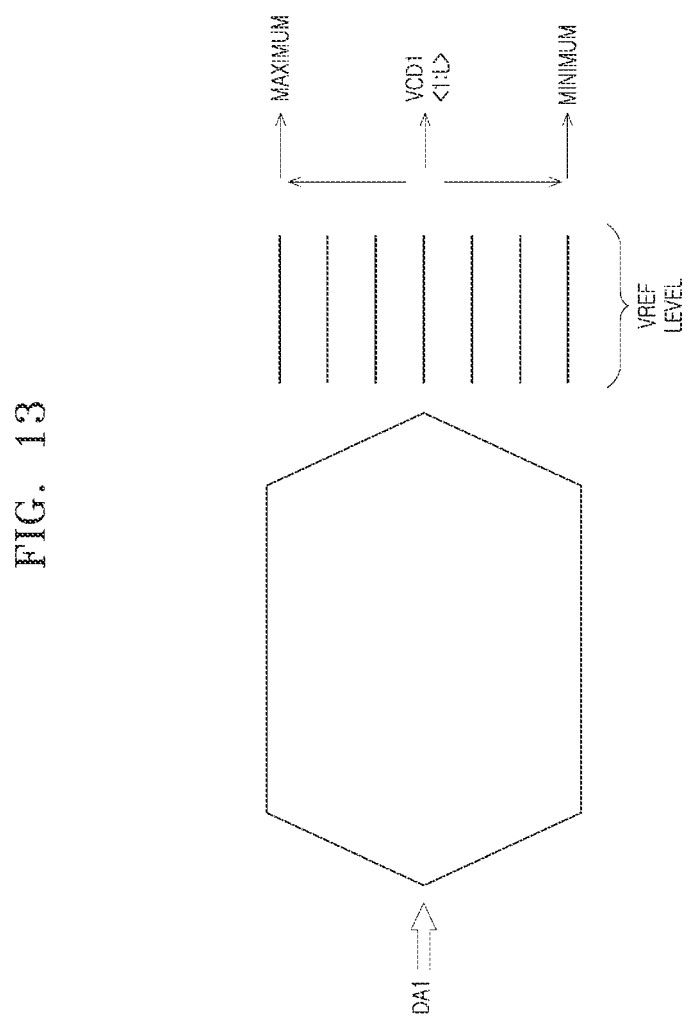
FIG. 13 is a diagram for explaining an operation for generating a voltage code signal in accordance with the embodiment of the present disclosure.

FIG. 13 is a diagram for explaining an operation for generating the first data DA1, the reference voltage VREF having a level that is adjusted depending on the first voltage code signal VCD1<1:L> and the first voltage code signal VCD1<1:L> in accordance with the other embodiment of the present disclosure.

In a period PASS during which the fail information signal FA_IF<1:M> is enabled to a logic high level, the first voltage code signal VCD1<1:L> is generated as a logic level combination having a middle value between a minimum value obtained as the first voltage code signal VCD1<1:L> is down counted and a maximum value obtained as the first voltage code signal VCD1<1:L> is up counted. The first voltage code signal VCD1<1:L> is generated as a logic level combination having the middle value of the period PASS in which the fail information signal FA_IF<1:M> is enabled to a logic high level.

The reference voltage VREF having a level that is adjusted depending on the first voltage code signal VCD1<1:L> is adjusted to a level between the logic high level and the logic low level of the first data DA1. The level of the reference voltage VREF decreases each time the first voltage code signal VCD1<1:L> is down counted, and increases each time the first voltage code signal VCD1<1:L> is up counted. In the patrol training operation, the reference voltage VREF is adjusted to the middle level between the logic high level and the logic low level of the first data DA1. The first voltage code signal VCD1<1:L> is generated as a logic level combination having the middle value of the period PASS in which the fail information signal FA_IF<1: M> is enabled to a logic high level. At this time, the first voltage code signal VCD1<1:L> is set as an optimal value.

As is apparent from the above description, the semiconductor system in accordance with the other embodiment of the present disclosure may perform a patrol training operation of adjusting the level of a reference voltage used to determine the logic level of data in a memory circuit during a write operation and a read operation. By performing the patrol training operation of adjusting the level of the reference voltage used to determine the logic level of data in the memory circuit during a write operation and a read operation, the semiconductor system in accordance with the other embodiment of the present disclosure may secure the reliability of data input and output through a signal transmission circuit.

Figure 14:
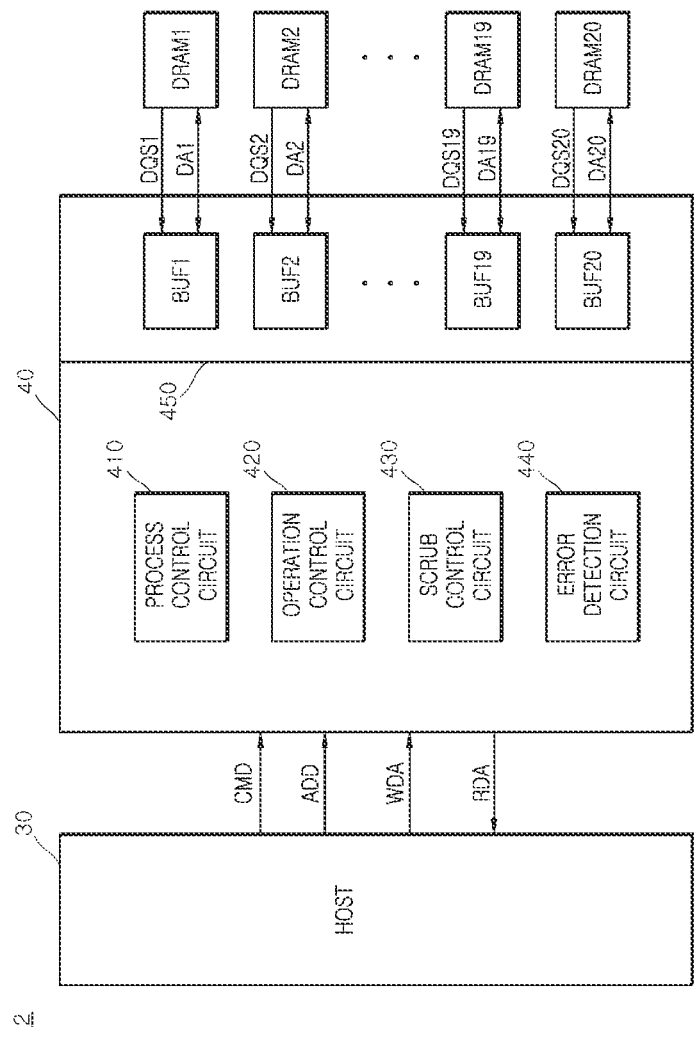
FIG. 14 is a block diagram illustrating a configuration of a semiconductor system in accordance with another embodiment of the present disclosure.

As illustrated in FIG. 14, a semiconductor system 2 in accordance with another embodiment of the present disclosure may include a host 30, a controller 40 and first to twentieth memory circuits DRAM1 to DRAM20.

The host 30 may output, to the controller 40, a command CMD, an address ADD and write data WDA for performing a write operation. The host 30 may output, to the controller 40, a command CMD and an address ADD for performing a read operation, and may receive read data RDA from the controller 40. While each of the command CMD, the address ADD, the write data WDA and the read data RDA is illustrated as one signal, it is to be noted that, according to an embodiment, each of the command CMD, the address ADD, the write data WDA and the read data RDA may be set as a signal including a plurality of bits.

The controller 40 may control the write operation of the first to twentieth memory circuits DRAM1 to DRAM20 by receiving the command CMD and the address ADD from the host 30. The controller 40 may control the read operation of the first to twentieth memory circuits DRAM1 to DRAM20 by receiving the command CMD and the address ADD from the host 30. The controller 40 may control a patrol training operation by receiving the command CMD and the address ADD from the host 30. In the patrol training operation, the controller 40 may control a read modify write operation of the first to twentieth memory circuits DRAM1 to DRAM20. The command CMD may be set as a command for performing the write operation, the read operation and the read modify write operation of the first to twentieth memory circuits DRAM1 to DRAM20, and may be set to include a plurality of bits. The address ADD may be set as a signal for selecting the first to twentieth memory circuits DRAM1 to DRAM20 in the write operation, the read operation and the read modify write operation, and may be set to include a plurality of bits. The controller 40 is implemented as a controller for controlling the operation of the first to twentieth memory circuits DRAM1 to DRAM20. However, according to an embodiment, the controller 40 may be implemented as any one of a test device and an electronic device for controlling the operation of the first to twentieth memory circuits DRAM1 to DRAM20.

The controller 40 may include a process control circuit 410, an operation control circuit 420, a scrub control circuit 430, an error detection circuit 440 and a signal transmission circuit 450.

During the write operation and the read operation, the process control circuit 410 may determine the patrol training operation. In the patrol training operation, the process control circuit 410 may adjust the enable time points of buffers 452 (see FIG. 16) which are coupled to the first to twentieth memory circuits DRAM1 to DRAM20.

The operation control circuit 420 may receive the command CMD and the address ADD from the host 30. The operation control circuit 420 may control the write operation and the read operation of a normal operation on the basis of the command CMD and the address ADD. The operation control circuit 420 may control the read modify write operation on the basis of the command CMD and the address ADD. The operation control circuit 420 may generate a training address TADD (see FIG. 15) by receiving a scrub address SADD (see FIG. 15) from the scrub control circuit 430.

The scrub control circuit 430 may receive the address ADD from the host 30. The scrub control circuit 430 may generate, from the address ADD, the scrub address SADD (see FIG. 15) for performing the read modify write operation.

In the write operation of the normal operation, the error detection circuit 440 may receive the write data WDA from the host 30. In the read operation of the normal operation, the error detection circuit 440 may generate the read data RDA by correcting an error included in first to twentieth data DA1 to DA20. In the read operation of the normal operation, the error detection circuit 440 may output the read data RDA to the host 30. In the read operation of the normal operation and the read modify write operation, the error detection circuit 440 may generate a fail information signal FA_IF<1:M> (see FIG. 15) depending on whether an error has occurred in the first to twentieth data DA1 to DA20. Although each of the first to twentieth data DA1 to DA20 is illustrated as one signal, according to an embodiment, each of the first to twentieth data DA1 to DA20 may be set as a signal including a plurality of bits.

The signal transmission circuit 450 may include first to twentieth buffer circuits BUF1 to BUF20. In the write operation and the read operation of the normal operation, the signal transmission circuit 450 may input and output the first to twentieth data DA1 to DA20 to and from the first to twentieth memory circuits DRAM1 to DRAM20. In the read operation of the normal operation, the signal transmission circuit 450 may receive first to twentieth strobe signals DQS1 to DQS20 from the first to twentieth memory circuits DRAM1 to DRAM20. In the patrol training operation, the signal transmission circuit 450 may receive the first to twentieth strobe signals DQS1 to DQS20 at adjusted enable time points. In the patrol training operation, the signal transmission circuit 450 may sample the first to twentieth data DA1 to DA20 in synchronization with the first to twentieth strobe signals DQS1 to DQS20 which are delayed.

In the write operation and the read modify write operation, the first to twentieth memory circuits DRAM1 to DRAM20 may receive the first to twentieth data DA1 to DA20 from the first to twentieth buffer circuits BUF1 to BUF20. In the write operation and the read modify write operation, the first to twentieth memory circuits DRAM1 to DRAM20 may store the first to twentieth data DA1 to DA20. In the read operation and the read modify write operation, the first to twentieth memory circuits DRAM1 to DRAM20 may output the first to twentieth data DA1 to DA20 stored therein to the first to twentieth buffer circuits BUF1 to BUF20.

The controller 40 and the first to twentieth memory circuits DRAM1 to DRAM20 may be implemented as a dual in-line memory module (DIMM).

Figure 15:
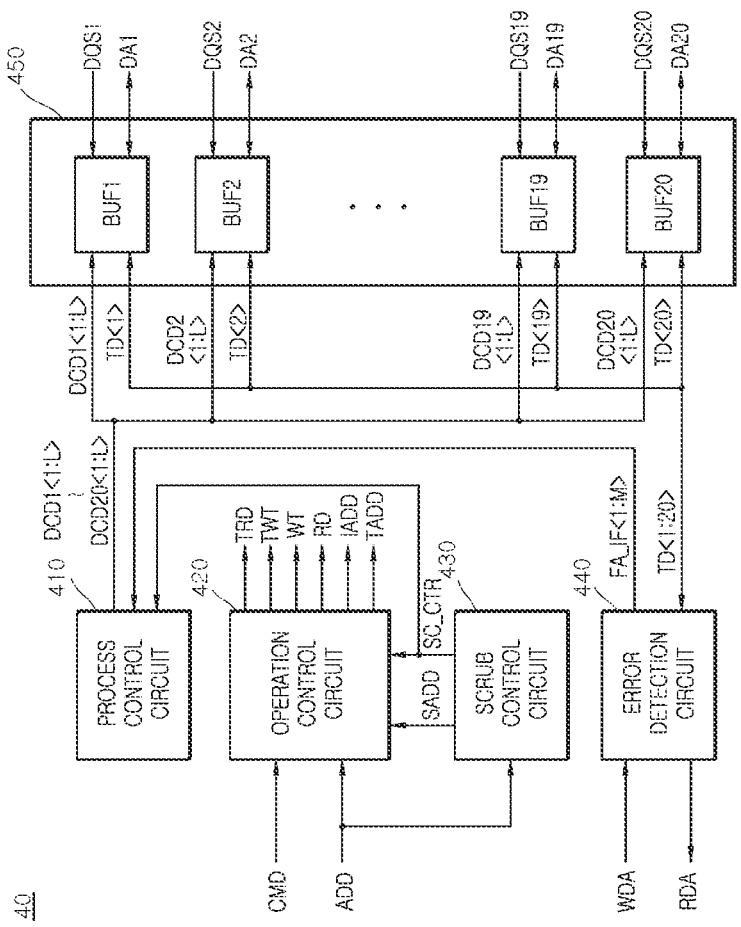
FIG. 15 is a block diagram illustrating a configuration of a controller included in the semiconductor system illustrated in FIG. 14.

FIG. 15 is a block diagram illustrating an embodiment of the controller 40. As illustrated in FIG. 15, the controller 40 may include the process control circuit 410, the operation control circuit 420, the scrub control circuit 430, the error detection circuit 440 and the signal transmission circuit 450.

During the write operation and the read operation, the process control circuit 410 may determine the patrol training operation. In the patrol training operation, the process control circuit 410 may adjust the enable time points of the buffers 452 (see FIG. 16) which are coupled to the first to twentieth memory circuits DRAM1 to DRAM20. During the patrol training operation, the process control circuit 410 may adjust first to twentieth delay code signals DCD1<1:L> to DCD20<1:L> for adjusting the enable time points, respectively, of the buffers 452 (see FIG. 16) included in the first to twentieth buffer circuits BUF1 to BUF20. During the patrol training operation, the process control circuit 410 may down count or up count the first to twentieth delay code signals DCD1<1:L> to DCD20<1:L> for adjusting the enable time points, respectively, of the buffers 452 (see FIG. 16) included in the first to twentieth buffer circuits BUF1 to BUF20, and then, may fix the first to twentieth delay code signals DCD1<1:L> to DCD20<1:L> on the basis of the scrub control signal SC_CTR and the fail information signal FA_IF<1:M>. During the patrol training operation, when down counting the first to twentieth delay code signals DCD1<1:L> to DCD20<1:L>, the process control circuit 410 may down count one time the first to twentieth delay code signals DCD1<1:L> to DCD20<1:L> after performing twice the read modify write operation on the basis of the fail information signal FA_IF<1:M>. This is to distinguish, during the read modify write operation, a case where an error occurs in the first to twentieth data DA1 to DA20 and a case where an error occurs in the signal transmission circuit 450. For example, in the case where an error has occurred in the first data DA1, since it is not a case where an error occurs in the signal transmission circuit 450, the process control circuit 410 may maintain the first delay code signal DCD1<1:L>, may then perform the read modify write operation again, and when there is no error on the basis of the fail information signal FA_IF<1:M>, may down count one time the first delay code signal DCD1<1:L>. During the patrol training operation, when up counting the first to twentieth delay code signals DCD1<1:L> to DCD20<1:L>, the process control circuit 410 may up count one time the first to twentieth delay code signals DCD1<1:L> to DCD20<1:L> after performing twice the read modify write operation on the basis of the fail information signal FA_IF<1:M>. This is to distinguish, during the read modify write operation, a case where an error occurs in the first to twentieth data DA1 to DA20 and a case where an error occurs in the signal transmission circuit 450. For example, in the case where an error has occurred in the first data DA1, since it is not a case where an error occurs in the signal transmission circuit 450, the process control circuit 410 may maintain the first delay code signal DCD1<1:L>, may then perform the read modify write operation again, and when there is no error on the basis of the fail information signal FA_IF<1:M>, may up count one time the first delay code signal DCD1<1:L>. Since the process control circuit 410 is implemented by the same circuit and performs the same operation as the process control circuit 210 illustrated in FIG. 3, detailed description thereof will be omitted herein. The process control circuit 410 may be implemented as a central processing unit (CPU) which is used in a semiconductor system.

The operation control circuit 420 may generate a write signal WT when a logic level combination of the command CMD is a combination for performing the write operation of the normal operation. The operation control circuit 420 may generate an internal address IADD from the address ADD when a logic level combination of the command CMD is a combination for performing the write operation of the normal operation. The operation control circuit 420 may generate a read signal RD when a logic level combination of the command CMD is a combination for performing the read operation of the normal operation. The operation control circuit 420 may generate the internal address IADD from the address ADD when a logic level combination of the command CMD is a combination for performing the read operation of the normal operation. When a logic level combination of the command CMD is a combination for performing the normal operation and the patrol training operation is performed, the operation control circuit 420 may generate, from the command CMD, a training read signal TRD and a training write signal TWT which are sequentially generated. The operation control circuit 420 may generate the training address TADD by receiving the scrub address SADD from the scrub control circuit 430. The operation control circuit 420 may output the write signal WT, the read signal RD, the internal address IADD, the training read signal TRD, the training write signal TWT and the training address TADD to the first to twentieth memory circuits DRAM1 to DRAM20. Since the operation control circuit 420 is implemented by the same circuit and performs the same operation as the operation control circuit 220 illustrated in FIG. 4, detailed description thereof will be omitted herein.

The scrub control circuit 430 may store the address ADD, and may generate the scrub address SADD from the stored address ADD. When the patrol training operation is performed during the normal operation, the scrub control circuit 430 may store the address ADD, and may generate the scrub address SADD from the stored address ADD. When the patrol training operation is performed during the normal operation, the scrub control circuit 430 may sequentially store a preset number of addresses ADD, and may sequentially generate scrub addresses SADD from the sequentially stored addresses ADD. For example, the scrub control circuit 430 may sequentially store addresses ADD for selecting the first memory circuit DRAM1, the third memory circuit DRAM3, the fifth memory circuit DRAM5 and the seventh memory circuit DRAM7, and then, may sequentially generate scrub addresses SADD for selecting the first memory circuit DRAM1, the third memory circuit DRAM3, the fifth memory circuit DRAM5 and the seventh memory circuit DRAM7. In the read modify write operation, the scrub control circuit 430 may output the scrub address SADD of the same logic level combination for the read operation and the write operation. In the patrol training operation during the normal operation, the scrub control circuit 430 may generate the scrub control signal SC_CTR when the number of stored addresses ADD reaches a preset value. For example, when the preset value is implemented to store four addresses ADD, the scrub control circuit 430 may generate the scrub control signal SC_CTR when addresses ADD for selecting the first memory circuit DRAM1, the third memory circuit DRAM3, the fifth memory circuit DRAM5 and the seventh memory circuit DRAM7 are stored. Since the scrub control circuit 430 is implemented by the same circuit and performs the same operation as the scrub control circuit 230 illustrated in FIG. 5, detailed description thereof will be omitted herein.

In the write operation of the normal operation, the error detection circuit 440 may generate first to twentieth transfer data TD<1:20> from the write data WDA. In the write operation of the normal operation, the error detection circuit 440 may output the first to twentieth transfer data TD<1:20> to the first to twentieth memory circuits DRAM1 to DRAM20. In the read operation of the normal operation, the error detection circuit 440 may receive the first to twentieth transfer data TD<1:20> from the first to twentieth memory circuits DRAM1 to DRAM20, and may detect an error of the first to twentieth transfer data TD<1:20>. In the read operation of the normal operation, the error detection circuit 440 may generate the read data RDA by correcting an error included in the first to twentieth transfer data TD<1:20>. In the read operation of the normal operation, the error detection circuit 440 may output the read data RDA to the host 30. In the read modify write operation, the error detection circuit 440 may receive the first to twentieth transfer data TD<1:20> from the first to twentieth memory circuits DRAM1 to DRAM20, and may detect an error of the first to twentieth transfer data TD<1:20>. In the read operation of the normal operation and the read modify write operation, the error detection circuit 440 may generate the fail information signal FA_IF<1:M> depending on whether an error has occurred in the first to twentieth transfer data TD<1:20>. The bits of the fail information signal FA_IF<1:M> may be generated at logic high levels when no error occurs in the first to twentieth transfer data TD<1:20>, and the bits of the fail information signal FA_IF<1:M> may be generated at logic low levels when an error occurs in the first to twentieth transfer data TD<1:20>. Since the error detection circuit 440 is implemented by the same circuit and performs the same operation as the error detection circuit 240 illustrated in FIG. 6, detailed description thereof will be omitted herein.

The signal transmission circuit 450 may include the first to twentieth buffer circuits BUF1 to BUF20.

The first buffer circuit BUF1 may receive the first strobe signal DQS1 at an enable time point of the buffer 452 (see FIG. 16) that is adjusted depending on the first delay code signal DCD1<1:L>. In the patrol training operation during the read operation, the first buffer circuit BUF1 may receive the first strobe signal DQS1 at an enable time point of the buffer 452 (see FIG. 16) that is adjusted depending on the first delay code signal DCD1<1:L>. In the patrol training operation during the read operation, the first buffer circuit BUF1 may generate the first transfer data TD1 by sampling the first data DA1 in synchronization with the received first strobe signal DQS1. In the patrol training operation during the write operation, the first buffer circuit BUF1 may receive the first strobe signal DQS1 at an enable time point of the buffer 452 (see FIG. 16) that is adjusted depending on the first delay code signal DCD1<1:L>. During the write operation, the first buffer circuit BUF1 may generate the first data DA1 by sampling the first transfer data TD1 in synchronization with the received first strobe signal DQS1. In the patrol training operation during the read modify write operation, the first buffer circuit BUF1 may receive the first strobe signal DQS1 at an enable time point of the buffer 452 (see FIG. 16) that is adjusted depending on the first delay code signal DCD1<1:L>. In the patrol training operation during the read modify write operation, the first buffer circuit BUF1 may generate the first transfer data TD1 by sampling the first data DA1 in synchronization with the received first strobe signal DQS1. Since the second to twentieth buffer circuits BUF2 to BUF20 perform the same operations as the first buffer circuit BUF1 except that input/output signals are different, detailed description thereof will be omitted herein.

In the write operation of the normal operation or the read modify write operation, the signal transmission circuit 450 may output the first to twentieth data DA1 to DA20, generated from the first to twentieth transfer data TD<1:20>, to the first to twentieth memory circuits DRAM1 to DRAM20. In the write operation of the normal operation or the read modify write operation, the signal transmission circuit 450 may receive the first to twentieth strobe signals DQS1 to DQS20 at adjusted enable time points of the buffers 452 (see FIG. 16). In the write operation of the normal operation or the read modify write operation, the signal transmission circuit 450 may generate the first to twentieth data DA1 to DA20 by sampling the first to twentieth transfer data TD<1:20> in synchronization with the received first to twentieth strobe signals DQS1 to DQS20. In the read operation of the normal operation or the read modify write operation, the signal transmission circuit 450 may output the first to twentieth transfer data TD<1:20>, generated from the first to twentieth data DA1 to DA20, to the error detection circuit 440. In the read operation of the normal operation or the read modify write operation, the signal transmission circuit 450 may receive the first to twentieth strobe signals DQS1 to DQS20 at adjusted enable time points of the buffers 452 (see FIG. 16). In the read operation of the normal operation or the read modify write operation, the signal transmission circuit 450 may generate the first to twentieth transfer data TD<1:20> by sampling the first to twentieth data DA1 to DA20 in synchronization with the received first to twentieth strobe signals DQS1 to DQS20.

The controller 40 is implemented to include the process control circuit 410, the operation control circuit 420, the scrub control circuit 430, the error detection circuit 440 and the signal transmission circuit 450. However, according to an embodiment, the host 30 may be implemented to include the process control circuit 410, the operation control circuit 420, the scrub control circuit 430, the error detection circuit 440 and the signal transmission circuit 450.

Figure 16:
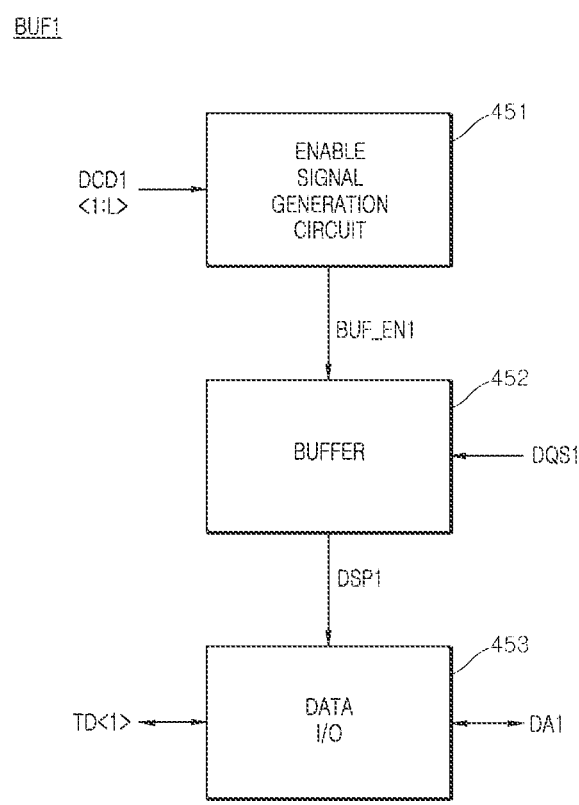
FIG. 16 is a block diagram illustrating a configuration of a first buffer circuit illustrated in FIG. 15.

FIG. 16 is a block diagram illustrating an embodiment of the first buffer circuit BUF1. As illustrated in FIG. 16, the first buffer circuit BUF1 may include an enable signal generation circuit 451, the buffer 452 and a data input/output circuit 453.

A delay amount of the enable signal generation circuit 451 may be adjusted depending on a logic level combination of the first delay code signal DCD1<1:L>. The enable signal generation circuit 451 may generate a first buffer enable signal BUF_EN1 having an enable time point that is adjusted by a delay amount adjusted by the first delay code signal DCD1<1:L>. A delay amount of the enable signal generation circuit 451 may be sequentially decreased each time the first delay code signal DCD1<1:L> is down counted. A delay amount of the enable signal generation circuit 451 may be sequentially increased each time the first delay code signal DCD1<1:L> is up counted.

The buffer 452 may receive the first strobe signal DQS1 in synchronization with a time point when the first buffer enable signal BUF_EN1 is enabled. The buffer 452 may output the first strobe signal DQS1 as a first sampling signal DSP1 in synchronization with a time point when the first buffer enable signal BUF_EN1 is enabled. The buffer 452 may output the first strobe signal DQS1 as the first sampling signal DSP1 during a period in which the first buffer enable signal BUF_EN1 is enabled.

In the read operation of the normal operation, the data input/output circuit 453 may generate the first transfer data TD<1> by sampling the first data DA1 in synchronization with the first sampling signal DSP1. In the read operation of the normal operation, the data input/output circuit 453 may generate the first transfer data TD<1> by sampling the first data DA1, input from the first memory circuit DRAM1, in synchronization with the first sampling signal DSP1. In the read operation of the normal operation, the data input/output circuit 453 may output the first transfer data TD<1> to the error detection circuit 440. In the write operation of the normal operation, the data input/output circuit 453 may generate the first data DA1 by sampling the first transfer data TD<1> in synchronization with the first sampling signal DSP1. In the write operation of the normal operation, the data input/output circuit 453 may generate the first data DA1 by sampling the first transfer data TD<1>, input from the error detection circuit 440, in synchronization with the first sampling signal DSP1. In the write operation of the normal operation, the data input/output circuit 453 may output the first data DA1 to the first memory circuit DRAM1.

The patrol training operation in accordance with the other embodiment of the present disclosure will be described below with reference to FIG. 17, by taking as an example the read operation for the first memory circuit DRAM1 during the normal operation.

Before the patrol training operation (BEFORE TRAINING), the first buffer enable signal BUF_EN1 is enabled after a pulse of the first strobe signal DQS1 for strobing the first data DA1 is generated. It may be seen that the first sampling signal DSP1 which is generated from the first strobe signal DQS1 during the enable period of the first buffer enable signal BUF_EN1 is generated after the first data DA1 is output. At this time, an error occurs in the first transfer data TD<1> which is generated from the first data DA1.

During the patrol training operation (DURING TRAINING), it may be seen that the first buffer enable signal BUF_EN1 is generated sequentially fast when the first delay code signal DCD1<1:L> is down counted and is generated sequentially slow when the first delay code signal DCD1<1:L> is up counted. During the patrol training operation (DURING TRAINING), the buffer enable signal BUF_EN1 generated faster when the first delay code signal DCD1<1:L> is down counted than when the first delay code signal DCD1<1:L> is up counted. During the patrol training operation (DURING TRAINING), the buffer enable signal BUF_EN1 generated more slowly when the first delay code signal DCD1<1:L> is up counted than when the first delay code signal DCD1<1:L> is down counted.

During the patrol training operation (DURING TRAINING), the error detection circuit 440 may sequentially generate the fail information signal FA_IF<1:M> depending on whether an error has occurred in the first transfer data TD<1> generated from the first data DA1 in synchronization with the first sampling signal DSP1 which is generated sequentially fast by the first buffer enable signal BUF_EN1 when the first delay code signal DCD1<1:L> is down counted. The bits of the fail information signal FA_IF<1:M> are generated at logic high levels when no error occurs in the first transfer data TD<1>, and the bits of the fail information signal FA_IF<1:M> are generated at logic low levels when an error occurs in the first transfer data TD<1>.

During the patrol training operation (DURING TRAINING), the error detection circuit 440 may sequentially generate the fail information signal FA_IF<1:M> depending on whether an error has occurred in the first transfer data TD<1> generated from the first data DA1 in synchronization with the first sampling signal DSP1 which is generated sequentially slow by the first buffer enable signal BUF_EN1 when the first delay code signal DCD1<1:L> is up counted. The bits of the fail information signal FA_IF<1:M> are generated at logic high levels when no error occurs in the first transfer data TD<1>, and the bits of the fail information signal FA_IF<1:M> are generated at logic low levels when an error occurs in the first transfer data TD<1>.

After the patrol training operation (AFTER TRAINING), by observing the first data DA1 and the edge of the first sampling signal DSP1 generated from the first strobe signal DQS1 during the enable period of the first buffer enable signal BUF_EN1, it may be seen that the logic level of the first data DA1 is maintained at the edge of the first sampling signal DSP1. At this time, no error occurs in the first transfer data TD<1> which is generated from the first data DA1 As described above with reference to FIG. 8, the first delay code signal DCD1<1:L> is generated as a logic level combination having the middle value of the period PASS in which the fail information signal FA_IF<1:M> is enabled to a logic high level. At this time, the first delay code signal DCD1<1:L> is set as an optimal value.

As is apparent from the above description, the semiconductor system in accordance with the other embodiment of the present disclosure may perform a patrol training operation of adjusting a delay amount of a signal transmission circuit coupling a controller and a memory circuit during a write operation and a read operation. By performing the patrol training operation of adjusting a delay amount of the signal transmission circuit coupling the controller and the memory circuit during a write operation and a read operation, the semiconductor system in accordance with the other embodiment of the present disclosure may secure the reliability of data input and output through the signal transmission circuit.

Although some embodiments of the present teachings have been disclosed for illustrative purposes, those skilled in the art will appreciate that various modifications, additions and substitutions are possible, without departing from the scope and spirit of the present teachings as defined in the accompanying claims.

What is claimed is:

1. A semiconductor system comprising:
a process control circuit configured to determine whether to perform a patrol training operation, and adjust a delay amount of a delay cell which is coupled to a target memory circuit, on the basis of a fail information signal corresponding to the target memory circuit;
an operation control circuit configured to receive a command and an address from a host, generate and output, to a plurality of memory circuits, a write signal, a read signal and an internal address for performing a normal operation, and perform a read modify write operation by receiving a scrub control signal;
a scrub control circuit configured to store a plurality of addresses, and generate the scrub control signal when the number of the stored addresses reaches a preset value; and
an error detection circuit configured to, in the read modify write operation, detect an error of data by receiving the data from the target memory circuit, and generate the fail information signal depending on whether an error has occurred in the data.

2. The semiconductor system according to claim 1, wherein the process control circuit determines whether to perform the patrol training operation during the normal operation.

3. The semiconductor system according to claim 1, wherein during the patrol training operation, the process control circuit down counts or up counts a delay code signal for adjusting the delay amount of the delay cell coupled to the target memory circuit, and thereafter, adjusts the delay code signal on the basis of the fail information signal.

4. The semiconductor system according to claim 1, wherein the process control circuit comprises:
a fail analysis circuit configured to analyze whether a fail has occurred in a training address, on the basis of the fail information signal when the scrub control signal is input, and output a fail analysis result signal;
a training control signal generation circuit configured to generate a training start signal, and generate a down control signal, an up control signal and a code output control signal on the basis of the fail analysis result signal; and
a code generation circuit configured to sequentially down count the delay code signal when the down control signal is input to the code generation circuit, sequentially up count the delay code signal when the up control signal is input to the code generation circuit, and fix the delay code signal when the code output control signal is input to the code generation circuit.

5. The semiconductor system according to claim 4, wherein when the code output control signal is input to the code generation circuit, the code generation circuit fixes the delay code signal to a middle value between a minimum value to which the delay code signal is down counted and a maximum value to which the delay code signal is up counted.

6. The semiconductor system according to claim 1, wherein the operation control circuit comprises:
a training control circuit configured to, when the scrub control signal is input to the training control circuit, generate the training address by receiving a scrub address from the scrub control circuit, and generate a training read signal and a training write signal for performing the read modify write operation; and
a read write control circuit configured to, when performing the normal operation, generate the write signal for performing a write operation and the read signal for performing a read operation, and generate the internal address from the address.

7. The semiconductor system according to claim 1, wherein the scrub control circuit comprises:
a scrub control signal generation circuit configured to generate the scrub control signal when an address storage completion signal is input to the scrub control signal generation circuit; and
a scrub address generation circuit configured to store the address when the training start signal is input to the scrub address generation circuit, generate the address storage completion signal when the number of stored addresses reaches the preset value, and output the stored addresses as the scrub address.

8. The semiconductor system according to claim 7, wherein the process control circuit initializes the delay amount of the delay cell when the address storage completion signal is generated.

9. The semiconductor system according to claim 1, wherein the error detection circuit comprises:
a parity generation circuit configured to, in the write operation of the normal operation, generate a parity as error information of write data output from the host, by performing an error correction code (ECC) encoding operation on the write data;
a syndrome generation circuit configured to, in the read operation of the normal operation, generate, on the basis of transfer data generated from the data, a syndrome for correcting an error of the transfer data;
a correction data generation circuit configured to generate correction data by correcting an error in the transfer data by performing an error correction code (ECC) decoding operation on the basis of the syndrome;
a data output circuit configured to output, in the write operation of the normal operation, the transfer data by synthesizing the write data and the parity as error information of the write data, and output, in the read operation of the normal operation, the correction data as read data; and a fail information signal generation circuit configured to generate the fail information signal by detecting an error in the transfer data on the basis of the syndrome.

10. The semiconductor system according to claim 1, further comprising:
an input and output (input/output) circuit coupled to the target memory circuit,
wherein the input/output circuit comprises:
the delay cell configured to generate a sampling signal by delaying a strobe signal by a delay amount adjusted by the delay code signal; and
a data sampling circuit configured to generate the transfer data by sampling the data, input to the data sampling circuit from the target memory circuit, in synchronization with the sampling signal.

11. An electronic device comprising:
a process control circuit configured to determine whether to perform a patrol training operation, and adjust a delay amount of a delay cell which is coupled to a target memory circuit, on the basis of a fail information signal corresponding to the target memory circuit;
an operation control circuit configured to receive a command and an address from a host, generate, from the command, a write signal and a read signal for performing a normal operation, and generate, from the address, an internal address for performing the normal operation; and
an error detection circuit configured to detect an error in data by receiving the data from the target memory circuit, and generate the fail information signal depending on whether the error has occurred in the data.

12. The electronic device according to claim 11, wherein the process control circuit determines whether to perform the patrol training operation during the normal operation.

13. The electronic device according to claim 11, wherein during the patrol training operation, the process control circuit down counts or up counts a delay code signal for adjusting the delay amount of the delay cell coupled to the target memory circuit, and thereafter, adjusts the delay code signal on the basis of the fail information signal.

14. The electronic device according to claim 11, wherein the process control circuit comprises:
a fail analysis circuit configured to analyze whether a fail has occurred in the address, on the basis of the fail information signal, and output a fail analysis result signal;
a training control signal generation circuit configured to generate a down control signal, an up control signal and a code output control signal on the basis of the fail analysis result signal; and
a code generation circuit configured to sequentially down count the delay code signal when the down control signal is input to the code generation circuit, sequentially up count the delay code signal when the up control signal is input to the code generation circuit, and fix the delay code signal when the code output control signal is input to the code generation circuit.

15. The electronic device according to claim 14, wherein when the code output control signal is input to the code generation circuit, the code generation circuit fixes the delay code signal to a middle value between a minimum value to which the delay code signal is down counted and a maximum value to which the delay code signal is up counted.

16. The electronic device according to claim 14, wherein the fail analysis circuit generates the fail analysis result signal on the basis of the fail information signal after the read signal is generated.

17. The electronic device according to claim 11, wherein the error detection circuit comprises:
a parity generation circuit configured to, in a write operation of the normal operation, generate a parity as error information of write data output from the host, by performing an error correction code (ECC) encoding operation on the write data;
a syndrome generation circuit configured to, in a read operation of the normal operation, generate, on the basis of transfer data generated from the data, a syndrome for correcting an error of the transfer data;
a correction data generation circuit configured to generate correction data by correcting an error in the transfer data by performing an error correction code (ECC) decoding operation on the basis of the syndrome;
a data output circuit configured to, in the read operation of the normal operation, output the correction data as read data; and
a fail information signal generation circuit configured to generate the fail information signal by detecting an error in the transfer data on the basis of the syndrome.

18. The electronic device according to claim 11, further comprising:
an input and output (input/output) circuit coupled to the target memory circuit,
wherein the input/output circuit comprises:
the delay cell configured to generate a sampling signal by delaying a strobe signal by a delay amount adjusted by the delay code signal; and
a data sampling circuit configured to generate the transfer data by sampling the data, input to the data sampling circuit from the target memory circuit, in synchronization with the sampling signal.

19. A semiconductor system comprising:
a process control circuit configured to determine whether to perform a patrol training operation, generate a voltage code signal for adjusting a level of a reference voltage which determines a logic level of data in a target memory circuit, and adjust the voltage code signal on the basis of a fail information signal corresponding to the target memory circuit;
an operation control circuit configured to receive a command and an address from a host, generate, from the command, a write signal and a read signal for performing a normal operation, and generate, from the address, an internal address for performing the normal operation; and
an error detection circuit configured to detect an error in the data by receiving the data from the target memory circuit, and generate the fail information signal depending on whether the error has occurred in the data.

20. The semiconductor system according to claim 19, wherein the process control circuit determines whether to perform the patrol training operation in a read operation during the normal operation.

21. The semiconductor system according to claim 19, wherein the process control circuit comprises:
a fail analysis circuit configured to analyze whether a fail has occurred in the address, on the basis of the fail information signal, and output a fail analysis result signal;
a training control signal generation circuit configured to generate a down control signal, an up control signal and a code output control signal on the basis of the fail analysis result signal; and
a code generation circuit configured to sequentially down count the voltage code signal when the down control signal is input to the code generation circuit, sequentially up count the voltage code signal when the up control signal is input to the code generation circuit, and fix the voltage code signal when the code output control signal is input to the code generation circuit.

22. The semiconductor system according to claim 21, wherein when the code output control signal is input to the code generation circuit, the code generation circuit fixes the voltage code signal to a middle value between a minimum value to which the voltage code signal is down counted and a maximum value to which the voltage code signal is up counted.

23. The semiconductor system according to claim 19, wherein the target memory circuit comprises:
- a memory area configured to output internal data stored in the memory area, on the basis of the read signal and the internal address;
- a voltage generator configured to generate the reference voltage having a voltage level that is adjusted depending on a logic level combination of the voltage code signal; and
- a data processing circuit configured to generate the data by comparing levels of the reference voltage and the internal data.

24. A semiconductor system comprising:
- a process control circuit configured to determine whether to perform a patrol training operation, and adjust an enable time point of a buffer which is coupled to a target memory circuit, on the basis of a fail information signal corresponding to the target memory circuit;
- an operation control circuit configured to receive a command and an address from a host, generate and output, to a plurality of memory circuits, a write signal, a read signal and an internal address for performing a normal operation, and perform a read modify write operation by receiving a scrub control signal;
- a scrub control circuit configured to store a plurality of addresses, and generate the scrub control signal when the number of the stored addresses reaches a preset value; and
- an error detection circuit configured to, in the read modify write operation, detect an error of data by receiving the data from the target memory circuit, and generate the fail information signal depending on whether an error has occurred in the data.

25. The semiconductor system according to claim 24, wherein during the patrol training operation, the process control circuit down counts or up counts a delay code signal for adjusting the enable time point of the buffer coupled to the target memory circuit, and thereafter, adjusts the delay code signal on the basis of the fail information signal.

26. The semiconductor system according to claim 24, further comprising:
- a buffer circuit,
- wherein the buffer circuit comprises:
- an enable signal generation circuit configured to generate a buffer enable signal having an enable time point that is adjusted by a delay amount adjusted by the delay code signal;
- the buffer configured to output a strobe signal as a sampling signal in synchronization with a time point when the buffer enable signal is enabled; and
- a data input and output (input/output) circuit configured to generate transfer data by sampling the data, input from the target memory circuit, in synchronization with the sampling signal.

* * * * *